United States Patent
Kumar M R et al.

(10) Patent No.: US 11,601,295 B2
(45) Date of Patent: Mar. 7, 2023

(54) CONTENT DELIVERY WITH RELIABLE MULTICAST USING A REDUNDANT UNICAST OVERLAY NETWORK

(71) Applicant: Juniper Networks, Inc., Sunnyvale, CA (US)

(72) Inventors: Ananda Kumar M R, Bangalore (IN); Sameer Seth, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 327 days.

(21) Appl. No.: 16/579,234

(22) Filed: Sep. 23, 2019

(65) Prior Publication Data

US 2021/0091968 A1     Mar. 25, 2021

(51) Int. Cl.
*H04L 12/761* (2013.01)
*H04L 12/18* (2006.01)
(Continued)

(52) U.S. Cl.
CPC .......... *H04L 12/185* (2013.01); *H04L 5/0055* (2013.01); *H04L 45/64* (2013.01);
(Continued)

(58) Field of Classification Search
CPC ... H04W 36/026; H04W 36/12; H04W 40/28; H04W 84/18; H04W 4/06; H04W 4/08;
(Continued)

(56) References Cited

U.S. PATENT DOCUMENTS 5,519,704 A   5/1996  Farinacci et al.
6,732,189 B1  5/2004  Novaes
(Continued)

FOREIGN PATENT DOCUMENTS

CN    1490976 A    4/2004
CN    101521586 A  9/2009
(Continued)

OTHER PUBLICATIONS

U.S. Appl. No. 16/367,727, filed Mar. 28, 2019, entitled, "Reliable Multicast Using a Redundant Unicast Overlay Network".
(Continued)

*Primary Examiner* — Khaled M Kassim
*Assistant Examiner* — Zhaohui Yang
(74) *Attorney, Agent, or Firm* — Shumaker & Sieffert, P.A.

(57) ABSTRACT

In one example, a system comprises a plurality of non-last-hop routers (non-LHRs) of a network, the non-LHRs configured with a multicast distribution tree for a multicast group to transport first multicast packets of a multicast flow toward one or more LHRs, wherein a router of the non-LHR routers is configured to receive unicast packets for an application session associated with the multicast group, encapsulate the unicast packets in a multicast header to generate the first multicast packets for distribution using the multicast distribution tree, and output the first multicast packets; and the one or more LHRs, wherein the one or more LHRs are interested receivers of the multicast group, and wherein the one or more LHRs are configured to receive the first multicast packets of the multicast flow, extract the unicast packets for the application session, and send the unicast packets to one or more clients of the application session.

18 Claims, 11 Drawing Sheets

(51) Int. Cl.
  *H04L 5/00* (2006.01)
  *H04L 45/64* (2022.01)
  *H04L 45/00* (2022.01)
  *H04L 67/143* (2022.01)
  *H04L 67/146* (2022.01)
  *H04L 69/22* (2022.01)
  *H04L 67/60* (2022.01)

(52) U.S. Cl.
  CPC ............ *H04L 45/72* (2013.01); *H04L 67/143* (2013.01); *H04L 67/146* (2013.01); *H04L 67/60* (2022.05); *H04L 69/22* (2013.01)

(58) Field of Classification Search
  CPC ............ H04W 72/005; H04N 21/6405; H04N 21/6408
  See application file for complete search history.

(56) References Cited

U.S. PATENT DOCUMENTS

| | | | |
|---|---|---|---|
| 7,080,157 | B2 | 7/2006 | McCanne |
| 7,672,275 | B2 | 3/2010 | Yajnik et al. |
| 8,510,551 | B1* | 8/2013 | Desai ................ H04L 63/0236 713/163 |
| 8,605,722 | B1 | 12/2013 | Sindhu et al. |
| 9,660,898 | B2 | 5/2017 | Peter et al. |
| 9,674,075 | B1 | 6/2017 | Nagarajan et al. |
| 10,432,688 | B2 | 10/2019 | Harden et al. |
| 10,720,821 | B2 | 7/2020 | Kelly |
| 10,951,428 | B2 | 3/2021 | Seth et al. |
| 2003/0185209 | A1 | 10/2003 | Lee |
| 2003/0233540 | A1* | 12/2003 | Banerjee ............ H04N 7/1675 713/153 |
| 2004/0090959 | A1* | 5/2004 | Cinghita ............ H04L 12/1836 370/390 |
| 2004/0098448 | A1* | 5/2004 | Fukushima ......... H04L 12/1836 709/201 |
| 2005/0027782 | A1* | 2/2005 | Jalan ................. H04L 12/4641 709/200 |
| 2008/0095160 | A1 | 4/2008 | Yadav et al. |
| 2008/0151775 | A1 | 6/2008 | Balint et al. |
| 2008/0201752 | A1 | 8/2008 | Liu et al. |
| 2011/0255458 | A1 | 10/2011 | Chen et al. |
| 2012/0076067 | A1* | 3/2012 | Yao ..................... H04L 12/189 370/312 |
| 2012/0092986 | A1 | 4/2012 | Chen |
| 2012/0327764 | A1 | 12/2012 | Han et al. |
| 2016/0269459 | A1* | 9/2016 | Harden ............... H04L 65/602 |
| 2016/0277199 | A1 | 9/2016 | Nagarajan et al. |
| 2017/0295093 | A1 | 10/2017 | Moreno et al. |
| 2018/0102965 | A1 | 4/2018 | Hari et al. |
| 2020/0077161 | A1* | 3/2020 | Loh .................... H04L 65/602 |

FOREIGN PATENT DOCUMENTS

| | | |
|---|---|---|
| CN | 105075218 A | 11/2015 |
| CN | 105721310 A | 6/2016 |
| CN | 106301694 A | 1/2017 |
| CN | 107409135 A | 11/2017 |
| EP | 1411688 A2 | 4/2004 |
| EP | 2200220 A1 | 6/2010 |
| WO | 2018210411 A1 | 11/2018 |

OTHER PUBLICATIONS

Shen et al., "Nexthop Fast ReRoute for IP and MPLS," <draft-shen-nhop-fastreroute-01.txt>, Network Working Group, Jul. 2004, 16 pp.

Extended Search Report dated Jun. 12, 2020 from counterpart European Application No. 19213052.4, 11 pp.

Jeacle et al., "Hybrid reliable multicast with TCP-XM," CoNEXT '05: Proceedings of the 2005 ACM conference on Emerging network experiment and technology, Oct. 24, 2005, pp. 177-187.

Beck et al., "An exposed approach to reliable multicast in heterogeneous logistical networks," CCGRID '03: Proceedings of the 3rd IEEE/ACM International Symposium on Cluster Computing and the Grid, May 12-15, 2003, 8 pp.

Response to Extended Search Report dated Jun. 12, 2020 from counterpart European Application No. 19213052.4, filed Sep. 24, 2021, 24 pp.

Notice of Allowance from U.S. Appl. No. 16/367,727, dated Nov. 13, 2020, 18 pp.

* cited by examiner

CONTENT DELIVERY WITH RELIABLE MULTICAST USING A REDUNDANT UNICAST OVERLAY NETWORK

TECHNICAL FIELD

The disclosure relates to computer networks and, more particularly, to forwarding network traffic within computer networks.

BACKGROUND

A routing protocol defines a process by which network devices, referred to as routers in packet-switched networks, communicate with each other to disseminate information that allows the routers to select routes between any two nodes on a computer network. One type of routing protocol, referred to as a link state protocol, allows routers to exchange and accumulate link state information, i.e., information describing the various links within the network. With a typical link state routing protocol, the routers exchange information related to available interfaces, metrics and other variables associated with network links. This allows a router to construct its own topology or map of the network. Some examples of link state protocols include the Open Shortest Path First (OSPF) protocol and the Intermediate-System to Intermediate System (IS-IS) protocol, which are Interior Gateway Protocols (IGP).

The connection between two devices on a network is generally referred to as a link. Connections between devices of different autonomous systems are referred to as external links while connections between devices within the same autonomous system are referred to as internal links. Many conventional computer networks, including the Internet, are designed to dynamically reroute data packets in the event an individual link fails. Upon failure of a link, the routers transmit new connectivity information to neighboring devices, allowing each device to update its local routing table. Links can fail for any number of reasons, such as failure of the physical infrastructure between the devices, or failure of the devices interfacing with the link.

When a link or router in the network fails, routers using traditional link state protocols such as OSPF and IS-IS may take a long time to adapt their forwarding tables in response to the topological change resulting from node and link failures in the network. The process of adapting the forwarding tables is known as convergence. This time delay occurs because recovery from a failure requires each node to re-compute the shortest path algorithm to calculate the next-hop for the affected nodes in the network. Until the next-hops are re-computed, traffic being sent toward the failed links may be dropped. Some deployments take time in the order of 500 milliseconds to several seconds for detection and recovery from failures in the network. These large convergence times may adversely affect the performance of Voice over Internet Protocol (VoIP) and multimedia applications, which are extremely sensitive to traffic loss. Service providers are demanding end-to-end failure detection and recovery times to be less than 50 milliseconds.

Using multicasting, a network distributes multicast packets to a set of interested receivers that can be on different subnetworks and that are configured as members of a multicast group. Protocol Independent Multicast (PIM) is one example of a protocol for creating multicast distribution trees in the network for distributing packets. Redundant multicast sources for multicast content can be configured with a common anycast IP address and each output a separate identical multicast stream. Due to the redundancy, in the event of network failure or failure of one of the redundant multicast sources, unicast routing converges around the failure and the network builds a new multicast distribution tree to distribute the multicast packets, e.g., from a still-active multicast source.

SUMMARY

In general, techniques are described for redundantly forwarding encapsulated multicast traffic, from a first-hop router (FHR) toward the last-hop routers (LHRs) of a multicast distribution tree, using reliable overlay connections established between adjacent nodes of the multicast distribution tree. For example, in response to receiving a PIM join request from a downstream router, a router may create a Transmission Control Protocol (TCP) connection to the downstream router. The router may also create a multicast forwarding entry (or add another next-hop to an existing multicast forwarding entry) in a multicast forwarding table to cause the router to replicate multicast packets, received for the multicast distribution tree, to the downstream router via the TCP connection. This process is repeated by each upstream router along the PIM join propagation path toward the source(s) for the multicast distribution tree. In this way, the PIM network of routers generates a parallel connection-oriented distribution tree for the multicast distribution tree.

When a router in the multicast distribution tree receives a multicast packet for which the downstream router is a next-hop on the multicast distribution tree and on the parallel connection-oriented distribution tree, the router encapsulates the multicast packet in a TCP header for the TCP connection and sends the encapsulated multicast packet to the downstream router via the TCP connection. (The router may first remove a TCP header for a TCP connection on which the router received the multicast packet.) The router may perform this step for each downstream router specified in the multicast forwarding entry for the multicast packet. Each of the non-last-hop routers in the multicast distribution tree may, in this way, reliably distribute packets along the routers of the multicast distribution tree. The last-hop routers of the multicast distribution tree remove the TCP header and can deliver the multicast packet to all interested receivers for the multicast flow. That is, the FHR intercepts the multicast data and also puts the intercepted multicast data on the TCP stream with additional metadata (e.g., containing the (User Datagram Protocol) UDP sequence number and the (S, G) tuple information) added to the original UDP datagrams of the multicast stream. From this point onwards, the techniques of this disclosure transport multicast data down the tree on two parallel paths, namely, (i) the normal UDP path (with an added UDP sequence number on each UDP datagram), and (ii) a TCP path (with added metadata including the UDP sequence number and the (S, G) tuple information).

The techniques may include adding sequence numbers to each multicast flow. The last hop routers may generate acknowledgements to indicate in-order receipt or "selective acknowledgements" to indicate out-of-order receipts, and transmit these messages upstream over the respective multicast path. If the gap-filling UDP packets are received over the multicast path, or are received in encapsulated form over the TCP channel, the last hop router may use the gap-filling packets (received over either of these channels) to fill the gap, or may discard any redundant packets that have already been replicated to fill the gap. In some buffering-based implementations, the last hop routers may store out of order multicast packets, i.e., multicast packets having a sequence number indicating a previous multicast packet in the sequence has not yet been received, for a multicast flow. In response to receiving the one or more missing multicast packets in the sequence via the corresponding parallel connection-oriented distribution tree, the last-hop router replicates the next multicast packets, that the last-hop router has buffered in the sequence for the multicast flow, to the interested receivers for the multicast flow. In this way, the parallel connection-oriented tree may be used to fill in gaps in a sequence of a multicast flow to facilitate reliable, in-order delivery a multicast flow to interested receivers.

The techniques may also include routers sending acknowledgements, to upstream routers of the multicast distribution tree, to indicate that multicast packets have been received. When an upstream router has received acknowledgement, from a downstream router of the multicast distribution tree, that a multicast packet for a multicast flow has been received via the multicast distribution tree, the upstream router may eschew forwarding a corresponding multicast packet for the acknowledged multicast packet to the downstream router via the TCP connection for the parallel connection-oriented distribution tree for the multicast distribution tree. The upstream router may forward the acknowledgement to its respective upstream router, if any, in the multicast distribution tree to propagate the acknowledgement.

The upstream routers (non-last hop routers) may house the data received from the respective upstream TCP channel in a temporary buffer and copy the TCP data to the respective downstream TCP socket buffer to forward the TCP data downstream in a continuous flow. In these implementations, the non-last hop routers continue to relay the data over the downstream TCP buffer. If the non-last hop router receives an acknowledgement message (directly or indirectly) from a last hop router indicating in-order receipt of a multicast packet over the multicast path, the non-last hop router may discard any TCP packets up to the acknowledgement-inducing sequence number, without forwarding those particular TCP packets. In some buffering-based implementations, the upstream router (a non-last hop router) may buffer an encapsulated multicast packet received via the parallel connection-oriented tree in a temporary buffer until the encapsulated multicast packet is copied to a TCP socket buffer for downstream replication on the parallel connection-oriented tree. If an upstream router receives an acknowledgment for the corresponding multicast packets from all of its downstream routers in the multicast distribution tree, the upstream router may discard the corresponding TCP packets. In this way, the routers may avoid sending any unnecessary copies of multicast packets to downstream routers where the multicast packets have already been received via the multicast distribution tree.

This disclosure also describes content delivery techniques for unicast traffic using a multicast distribution tree and a parallel connection-oriented distribution tree. For example, many services use TCP/UDP unicasting to deliver content from a server to a client. Such services include File Transfer Protocol (FTP), HyperText Transfer Protocol (HTTP) live streaming, UDP live streaming, backup applications, In-Service Software Upgrades (ISSU), software upgrades, and others. As described herein, network routers may create a multicast distribution tree and a parallel connection-oriented distribution tree to deliver content transmitted from a server, the content transmitted from the server using TCP/UDP and destined to a non-multicast address, to multiple clients. The FHR for the content impersonates a multicast server for the content and receives the content from the server. Using multicast distribution tree and the parallel connection-oriented distribution tree established for the content, the FHR and other routers of the network effectively and reliably multicast the content to LHRs for any clients requesting the same content from the same server.

In this way, when multiple clients are requesting the same content from the same server, the network routers provide reliable multicast for the content to reach all of the clients without requiring multiple parallel sessions between the clients and server. The techniques may therefore reduce a processing burden on the server, may reduce a total amount of traffic within the network by multicasting a single data stream of the content rather than unicast content on a per-session basis to requesting clients of the content from the server. Moreover, the above advantages may be achieved without modification to the server or the clients and may be achieved without requiring additional hardware infrastructure.

In one example, this disclosure describes a system comprising: a plurality of non-last-hop routers (non-LHRs) of a network, the non-LHRs configured with a multicast distribution tree for a multicast group to transport first multicast packets of a multicast flow toward one or more last-hop routers (LHRs), wherein a router of the non-LHR routers is configured to receive unicast packets for an application session associated with the multicast group, encapsulate the unicast packets in a multicast header to generate the first multicast packets for distribution using the multicast distribution tree, and output the first multicast packets; and the one or more LHRs, wherein the one or more LHRs are interested receivers of the multicast group, and wherein the one or more LHRs are configured to receive the first multicast packets of the multicast flow, extract the unicast packets for the application session, and send the unicast packets to one or more clients of the application session.

In another example, this disclosure describes router comprising: processing circuitry in communication with a memory, the processing circuitry being configured to: receive a multicast group request including a session identifier for an application session; create, in response to receiving the multicast group request, a multicast group for the application session; receive unicast packets for the application session associated with the multicast group; encapsulate the unicast packets in a multicast header to generate first multicast packets for distribution using a multicast distribution tree; and output the first multicast packets.

In another example, this disclosure describes a router comprising processing circuitry in communication with a memory, the processing circuitry being configured to: in response to receiving a content request from a requester client of one or more clients of an application session, output a multicast group request, wherein the multicast group request includes a session identifier for the application session; receive a multicast group notification message that includes an association of a multicast group and the session identifier for the application session; store, in response to receiving the multicast group notification message, an association of the multicast group and the requester client; receive first multicast traffic for the multicast group; map, based at least on the association of the multicast group and the requester client, a destination group address of the first multicast traffic to the requester client; extract unicast packets for the application session from the first multicast traffic; and send the unicast packets to the requester client.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
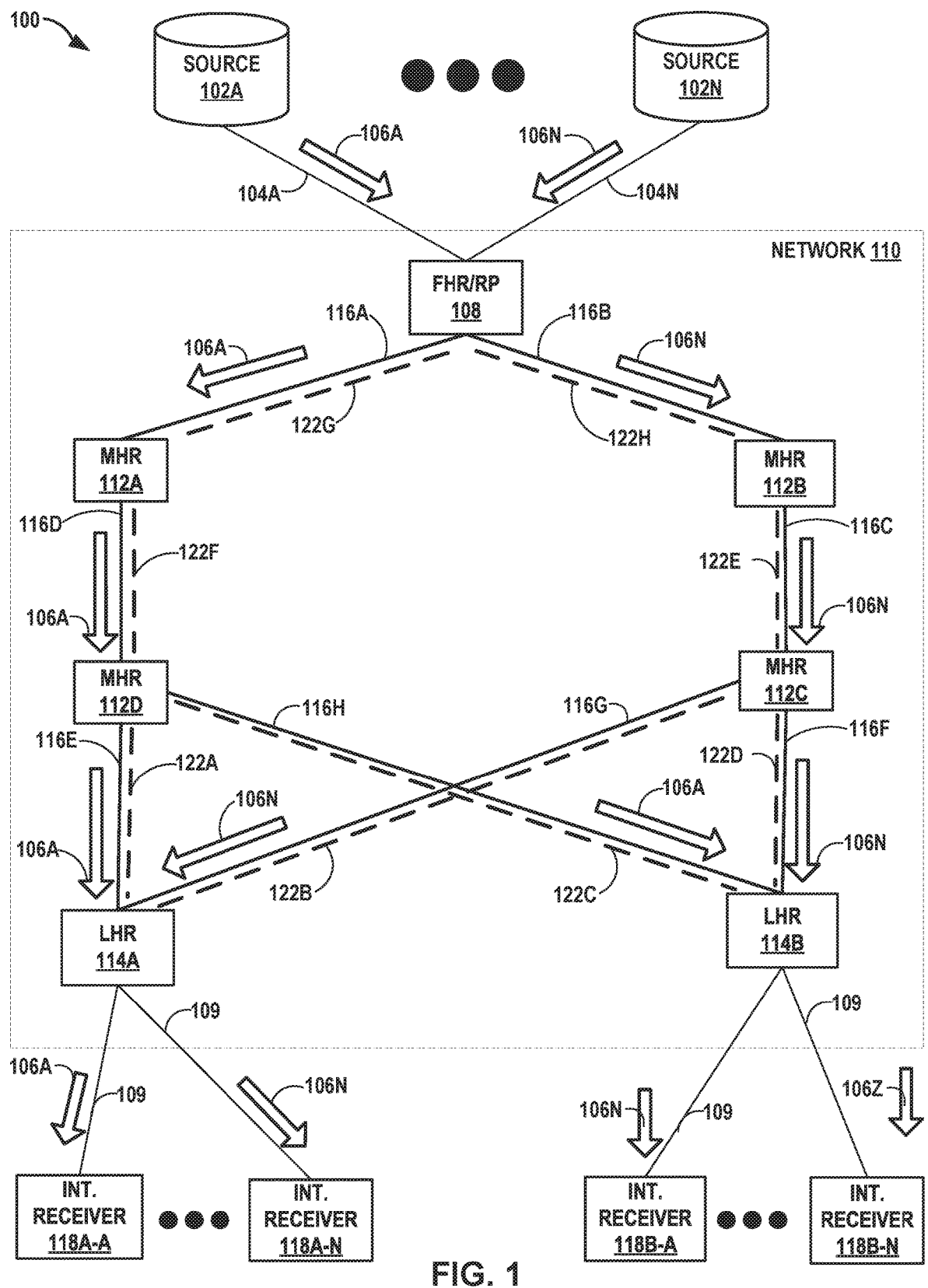
FIG. 1 is a block diagram illustrating a system that includes an example network of this disclosure formed using various network devices that are communicatively linked with one another, either directly or indirectly.

Existing multicast architectures use Protocol Independent Multicast (PIM) and/or the Internet Group Management Protocol (IGMP) to implement multicast streaming over Internet Protocol (IP) networks. According to these existing multicast architectures, data traffic flows in only one direction, and flows from one or more sources of the multicast architecture to all endpoints of the multicast architecture, which represent so-called "interested receivers." Based on these features of multicast streaming, the data traffic in a multicast topology can be illustrated as flowing from top to bottom in a tree structure. As such, any given multicast topology can be depicted using a corresponding "multicast tree."

Described at a high level, end-to-end multicast setup and streaming works in two phases. The first phase can be termed "multicast tree establishment," and the second phase can be termed "data distribution from source(s) to interested receivers." The first phase, multicast tree establishment, entails setting up the paths from the source(s) to the interested receivers. The second phase, data distribution, relies on IGMP and PIM significantly to transmit data from the source(s) to the interested receivers. Throughout this disclosure, an IP router directly connected to a multicast source is referred to herein as a first hop router (FHR), an IP router connected directly to an interested receiver (or endpoint) is referred to herein as a last hop routers (LHR), and any IP router positioned between an FHR and one or more LHRs in the multicast topology are referred to herein as middle hop or mid hop routers (MHRs). Additionally, at least one of the IP routers in a given multicast topology is designated, either statically or dynamically, as a so-called "rendezvous point" (RP).

According to the existing multicast architectures, interested receivers send an IGMP "join" signal to the respective LHRs. The IGMP join signals include the multicast group address from which the interested receivers are interested in receiving multicast data. The source device(s) send an IGMP join signal to the respective FHR, with the multicast group address of the data being transmitted, and a source address. Each LHR sends a PIM "join" request upstream, towards the RP. The PIM join request includes a (*,G) tuple, where 'G' denotes the multicast group identified by the interested receiver, and '*' represents any source that transmits data downstream over the 'G' multicast group.

During this process, each MHR positioned between the respective LHR and the RP creates two tables in the kernel. The first table is an outgoing interface list (OIL). The OIL lists all of the interfaces over which the MHR forwards a multicast packet for a particular 'G' group downstream, i.e. towards the interested receivers for the 'G' group. The second table is an incoming interface list (IIL) that lists the interfaces over which the MHR should receive the multicast packets for a particular (S, G) tuple, where 'S' denotes the source IP address. The FHR initially sends an (S, G) tuple towards the RP, and the RP then forwards the PIM join message(s) upstream towards the FHR. The process of the FHR providing the source IP address to the RP and the RP forwarding the received PIM join messages to the FHR is known as a "PIM registration process."

This disclosure describes techniques and system configurations that overlay a set of unicast (point-to-point) connections upon a multicast distribution tree. The overlay network is referred to herein as a connection-oriented distribution tree, and is described as being implemented in parallel with the multicast distribution tree. The parallel connection-oriented distribution tree of this disclosure forms a redundant overlay structure with respect to the multicast tree, and thereby adds unicast-based reliability measures to enhance the reliability of the multicast tree. Although the parallel connection-oriented distribution tree of this disclosure can be implemented using a variety of unicast or point-to-point protocols, the examples of the parallel connection-oriented distribution tree network are described below as conforming to the transmission control protocol (TCP), as a non-limiting example. The parallel connection-oriented distribution trees of this disclosure function according to a three-phase scheme. The first phase relates to TCP control path creation. The second phase relates to UDP datagram encapsulation. The third phase relates to decapsulation of UDP datagrams at LHR(s). The parallel connection-oriented distribution trees of this disclosure are described in further detail below, making reference to the drawings.

This disclosure also describes content delivery techniques for unicast traffic using a multicast distribution tree and a parallel connection-oriented distribution tree. For example, many services use TCP/UDP unicasting to deliver content from a server to a client. Such m:services include File Transfer Protocol (FTP), HyperText Transfer Protocol (HTTP) live streaming, UDP live streaming, backup applications, In-Service Software Upgrades (ISSU), software upgrades, and others. As described herein, network routers may create a multicast distribution tree and a parallel connection-oriented distribution tree to deliver transmitted content transmitted from a server, the content transmitted from the server using TCP/UDP and destined to a non-multicast address, to multiple clients. The FHR for the content impersonates a multicast server for the content and receives the content from the server. Using multicast distribution tree and the parallel connection-oriented distribution tree established for the content, the FHR and other routers of the network effectively and reliably multicast the content to LHRs for any clients requesting the same content from the same server.

In this way, when multiple clients are requesting the same content from the same server, the network routers provide reliable multicast for the content to reach all of the clients without requiring multiple parallel sessions between the clients and server. The techniques may therefore reduce a processing burden on the server, may reduce a total amount of traffic within the network by multicasting a single data stream of the content rather than unicast content on a per-session basis to requesting client of the content from the server. Moreover, the above advantages may be achieved without modification to the server or the clients and may be achieved without requiring additional hardware infrastructure.

FIG. 1 is a block diagram illustrating a system 100 that includes an example network 110 formed using various network devices that are communicatively linked with one another, either directly or indirectly. Sources 102A-102 (collectively, "sources 102") represent multicast sources or multicast origination points. Sources 102 source multicast flow 106A-106N ("multicast flows 106) respective for delivery to one or more interested receivers via network 110. Each of sources 102 may have a statically- or dynamically-set source IP address, which forms the 'S' component of any (S, G) tuples that each of sources 102 includes in downstream communication during the PIM registration process for multicast service. Again, each of multicast flows 106 may include varying amounts of data to provide different types of multicast services, such as streaming media (video and/or audio), teleconferencing, database replication, distributed computing, real-time workgroup technologies, dissemination of safety measures and/or medical procedures during an emergency, etc.

Sources 102 use the communicative links of network 110 to relay multicast flows 106 to pertinent subscribers among interested receivers 118, which are described below in further detail. Sources 102 use respective links 104 to participate in the PIM registration process over network 110, and to inject respective multicast flows 106 as ingress communications into network 110. Sources 102 are communicatively coupled via links 104 to FHR/RP 108. More specifically, according to the system configuration of this disclosure illustrated in FIG. 1, a single ingress node (or FHR) is also designated as an RP of network 110. The particular configuration illustrated in FIG. 1 is one non-limiting example, in which an ingress node performs the dual functions of being an FHR and an RP, thereby simplifying the multicast topology.

However, it will be appreciated that in other implementations of the techniques of this disclosure, any router of the network 110 portion of the multicast distribution tree represented by system 100 can be configured as an RP, statically or dynamically, using a bootstrap method. Irrespective of which router is designated to perform the RP role, the unicast overlay logic implemented between adjacent routers of network 110 remains the same as described below with respect to the implementation shown in FIG. 1.

In general, a multicast RP serves as a convergence and distribution point. In the case of system 100, all of multicast flows 106 converge on FHR/RP 108. Although a multicast RP is not the origin server for any multicast stream, FHR/RP 108 can be considered a multicast source, within the confines of network 110. FHR/RP 108 is coupled via links 116, directly or indirectly, to MHRs 112. MHRs 112, in turn, link FHR/RP to LHRs 114. LHRs 114 serve as egress points of network 110, in that LHRs 114 are directly coupled to interested receivers 118. Interested receivers 118 are endpoints of the multicast tree represented by system 100. That is, interested receivers 118 represent data consumer devices, such as connected streaming and/or output devices deployed at a home, an enterprise, a government agency, etc.

In the example of FIG. 1, interested receivers 118A-A and 118B-A request delivery of multicast flow 106A, while interested receivers 118A-N and 118B-N request delivery of multicast flow 106N. In conjunction with the above-described aspects of multicast tree formation, interested receivers 118A-A and 118B-A send PIM join requests to LHRs 114A and 114B, respectively, specifying multicast flow 106A as being requested for delivery. More specifically, interested receivers 118A-A and 118B-A send PIM join requests including the (*,G) tuple, where 'G' represents the multicast group ID of multicast flow 106A, and '*' leaves open the source from which multicast flow 106A is to be obtained. Correspondingly, interested receivers 118A-N and 118B-N send PIM join requests to LHRs 114A and 114B respectively, the PIM join requests including (*,G) tuple, where 'G' represents the multicast group ID of multicast flow 106N, and '*' leaves open the source from which multicast flow 106N is to be obtained.

LHRs 114A and 114B forward the PIM join requests upstream, via MHRs 112, to FHR/RP 108. FHR/RP 108 maps the respective 'G' values of the PIM join requests to the corresponding 'G' values of the (S, G) tuples advertised by sources 102. Upon matching the requested 'G' values of the PIM join requests to the 'G' values of (S, G) multicast channels available from sources 102, FHR/RP 108 completes the PIM registration process for interested receivers 118. FHR/RP 108 then determines the multicast tree to include the shortest paths from each of sources 102 to respective interested receivers 118 that generated requests to receive multicast flows 106. In this way, FHR/RP 108 sets up individual forwarding paths for each (S, G) multicast channel available from sources 102 to the respective interested receivers 118, using MHRs 112 and LHRs 114 as conduits.

The ever-increasing volume of streaming data being consumed via multicast streams introduces greater chance of reliability vulnerabilities. For instance, a very large number of interested receivers 118 requesting delivery the same multicast channel from any of sources 102 at approximately the same time can cause a failure in setting up the multicast tree. As another example, the concurrent delivery of the same multicast channel from any of sources 102 to a large number of interested receivers 118 can cause packet loss, thereby negatively affecting multicast performance from the perspective of end users. Not only does packet loss diminish the user experience with respect to data consumption, but may also interfere with operations of important functions of various private entities, educational institutions, healthcare institutions, government entities, etc.

The system configurations of this disclosure enable network 110 to enhance reliability of the delivery of multicast flows 106 to interested receivers 118. FHR/RP 108, MHRs 112, and LHRs 114 provide fast packet loss resilience by implementing a parallel network of unicast (point-to-point) connections to back up the transmission of multicast flows 106. Again, the set of redundant unicast connections is described herein as a parallel, connection-oriented distribution tree that provides overlay capabilities with respect to the multicast distribution tree formed over network 110. Using the connection-oriented distribution tree in parallel with the multicast distribution tree, FHR/RP 108, MHRs 112, and LHRs 114 leverage packet receipt acknowledgment (and negative acknowledgments) that are available in point-to-point scenarios, to enhance the reliability of multicast delivery, which does not include the same level of packet receipt acknowledgment functionalities.

The devices of network 110 implement the connection-oriented distribution tree of this disclosure in three phases, namely control path creation (or connection establishment), UDP datagram encapsulation, and UDP datagram decapsulation. Again, while the system configurations of this disclosure are compatible with using various types of unicast protocols, the implementations are described below with respect to implementing a TCP-based overlay network over the multicast distribution tree. The devices of network 110 perform TCP connection establishment by first identifying every adjacent pair of routers among FHR/RP 108, MHRs 112, and LHRs. 114 (collectively, "routers of network 110" or "nodes of network 110"). FHR/RP 108 and MHRs 112 are referred to collectively as "non-LHRs of network 110."

The routers of network 110 create in-kernel TCP connections between each pair thereof, to form the connection-oriented distribution tree. For example, the routers of network 110 may generate the in-kernel TCP connections during or concurrently with the multicast tree formation from FHR/RP 108 to LHRs 114 for a given multicast flow 106 (which is represented by a particular (S, G) flow of multicast packets). In this example, each adjacent pair of routers of network 110 for each TCP connection is determined based on the information included in the PIM join request/message traversing a path from any of LHRs 114 towards FHR/RP 108.

In one use case scenario, LHR 114A forwards a PIM join message received from interested receiver 118A-A, communicating a request to receive delivery of multicast flow 106A. In this use case scenario, and in the context of the TCP connection establishment phase of the reliable connection-oriented distribution techniques of this disclosure, LHR 114A functions as a TCP client, and the neighbor IP address field in the PIM join message (in this case, specifying MHR 112D) functions as the TCP server address. Based on LHR 114A being the TCP client and MHR 112D being the TCP server with respect to this particular traversal of the PIM join message, a point-to-point TCP connection is established between LHR 114A and MHR 112D over link 116E.

The TCP connection between LHR 114A is illustrated in FIG. 1 as TCP connection 122A. As each respective PIM join message is propagated upstream from interested receivers 118 towards FHR/RP 108, the adjacent routers of network 110 generate each respective TCP connection 122 based on the same logic described above with respect to TCP connection 122A. In this way, each respective TCP connection 122 represents an in-kernel TCP connection created by the routers of network 110 by intercepting the PIM join packets, using a kernel packet filtering framework at each respective downstream router.

Along with creating TCP connections 122 between each pair of adjacent routers of network 110 included in the multicast topology for a given multicast flow 106 (each being a packet flow defined by a particular (S, G) tuple), each non-LHR of network 110 creates a reliable multicast forwarding table in the respective kernel. Each non-LHR of network 110 uses the reliable multicast table as an aid in choosing the appropriate TCP socket/connection to back up each of multicast flows 106. Each non-LHR of network 110 uses the reliable multicast table in the second phase of the unicast overlay techniques of this disclosure.

The second phase of the reliable connection-oriented distribution of this disclosure includes encapsulation of UDP datagrams (from the respective multicast flow 106) in a TCP header, and relaying the TCP-encapsulated multicast datagrams from FHR/RP 108 to LHRs 114 to provide the added reliability measures of this disclosure. The encapsulation phase relies on the in-kernel TCP connections (TCP connections 122) described above that form a unicast tree that mirrors the multicast tree connecting sources 102 to interested receivers 118. All UDP datagrams, regardless of their respective (S, G) tuples (i.e. across multiple multicast flows 106) are mapped to a single TCP connection 122 between two adjacent nodes of network 110 along the multicast distribution tree, provided that all of these multiple multicast flows 106 follow the same multicast path. In this way, the techniques of this disclosure provide efficiencies by avoiding dedicated TCP connections for each multicast flow 106, in cases in which multiple multicast flows 106 follow the same multicast path downstream over network 110.

FHR/RP 108, being the convergence point of all of multicast flows 106, intercepts each UDP multicast packet, and processes each multicast packet in the kernel according to a kernel packet filtering framework. FHR/RP 108 adds a sequence number between the UDP header and the payload, and replicates the UDP datagram (with the embedded sequence number) for downstream transmission over the multicast distribution tree to MHRs 112. FHR/RP 108 also encapsulates each UDP datagram (including its IP header) by adding an inter-process communication (IPC) header outside of the UDP header. The sequence number that FHR/RP 108 embeds between the UDP header and the payload is specific to each multicast flow 106, and indicates the order in which the corresponding UDP datagram should be received over the respective multicast flow 106. LHRs 114 use the sequence number to determine whether the UDP datagrams up till a certain point of time have been received in sequence, or there are any gaps in the receipt of the UDP datagrams.

FHR/RP 108 sends each IPC-encapsulated UDP packet, with the added sequence number, downstream to the pertinent LHR(s) 114 over the respective TCP connection 122G or 122H over the connection-oriented distribution tree implemented in parallel to the multicast distribution tree. In addition to a multicast UDP-over-IP datagram (e.g., encapsulated UDP datagram with the added sequence number) being sent over any of TCP connections 122, the following metadata is added to the original multicast datagram that is communicated over the multicast distribution tree: {UDP seq no., (S, G)}. Each router of network 110 may, when a TCP segment is received, read the (S, G) tuple from the metadata to determine the next TCP socket to which this multicast datagram should be copied. As such, the non-LHRs of network 110 encapsulate multicast IP datagrams with the metadata specified in this disclosure, and then sending the encapsulated UDP datagrams downstream over the respective TCP connection 122.

FHR/RP 108 forwards the IPC message (which is a multicast UDP datagram encapsulated with an IPC header) over the respective TCP connection 122 downstream, i.e. to either MHR 112A or MHR 112B, depending on the relevant entry in the reliable multicast forwarding table. If FHR/RP 108 receives an acknowledgement (or "ACK") message from the respective MHR 112, then FHR/RP 108, FHR/RP 108 purges all local buffers (whether a local buffer or a TCP socket buffer) of the corresponding IPC-encapsulated UDP datagrams.

Each of MHRs 112A and MHR 112B clears its respective buffer(s) of the received IPC-encapsulated UDP datagrams contingent on receiving an ACK message from the respective downstream MHR 112 for the corresponding sequence number-based UDP datagram of the respective multicast flow 106. If MHR 112A and/or 112B does not receive an ACK for the corresponding sequence number-based UDP datagram of the respective multicast flow 106 from the respective downstream MHR 112, then MHR 112A and/or 112B decapsulates the TCP packet, re-encapsulates the UDP datagram in a new IPC header, and forwards the IPC message downstream. The same process iterates in compliance with TCP transmission until the IPC message reaches LHRs 114, absent the receipt of an ACK message for the corresponding sequence number-based UDP datagram of the respective multicast flow 106.

In this way, the routers of network 110 propagate IPC messages that include multicast UDP datagrams from FHR/RP 108 to LHRs 114 in parallel with the corresponding multicast flow 106, to the extent that a downstream non-LHR of network 110 did not receive an ACK for the corresponding sequence number-based UDP datagram of the respective multicast flow 106. In this way, the parallel connection-oriented distribution tree of this disclosure provides a backup mechanism to the multicast flows 106 that provides reliability while minimizing buffering costs to reduce packet loss stemming from multicast overburdening.

The third phase of implementing the reliable connection-oriented distribution techniques of this disclosure is described herein as a UDP datagram decapsulation phase. The UDP datagram decapsulation of the described techniques involves LHRs 114 serving a dual purpose of being a TCP endpoint, and thereby receiving the IPC messages corresponding to the UDP datagrams of multicast flows 106. LHRs 114 remove or "strip" the IPC headers of the IPC packets received over TCP connections 122A-D. LHRs 114 recreate or recover the complete UDP datagram (with the sequence number added by FHR/RP 108) by modifying a TTL field in the IPC header, and by updating an IP checksum.

LHRs 114 decapsulate the UDP datagrams received over multicast flows 106 to obtain the sequence number of each UDP datagram. Again, the sequence number is a value that FHR/RP 108 adds, to indicate the sequential placement of the UDP datagram in the respective multicast flow 106. LHRs 114 generate an acknowledgment (or ACK) message and transmit the ACK message upstream to confirm receipt of each UDP datagram, provided that all previous UDP datagrams, as indicated by prior sequence numbers, have also been received. MHRs 112 forward any ACK messages originated by LHRs 114 upstream, enabling the non-LHRs of network 110 to cease forwarding of the corresponding TCP packets that encapsulate the UDP packets with the same sequence numbers along the same (S, G) flow.

Conversely, LHRs 114 may detect a missing UDP datagram, based on a gap in the sequence numbers of the UDP datagrams received via multicast flows 106. If LHRs 114 detect a gap in the sequence of UDP datagrams based on receiving a UDP datagram of later sequence number without having received UDP datagrams of one or more prior or intervening sequence numbers, LHRs 114 generate a "selective acknowledgment" or SACK message with respect to the UDP datagram that is received out of order. LHRs 114 transmit any generated SACK messages upstream to report the gap in sequence, thereby alerting one or more non-LHRs of network 110 to possible packet loss, delay, or other malfunction of the multicast distribution tree with respect to the pertinent multicast flow 106, as identified by the (S, G) tuple embedded in the UDP datagrams.

In this way, LHRs 114 implement the techniques of this disclosure to confirm receipt or report multicast packet loss, as the case may be, using TCP-based technology, and with respect to corresponding multicast flows 106. In the case of LHRs 114 sending ACK messages to confirm receipt of a UDP datagram of multicast flows 106 in-order, the non-LHRs of network 110 clear the corresponding UDP datagrams up to the latest acknowledged sequence number from all locally-implemented buffers. MHRs 112C and 112D propagate the ACK messages upstream, enabling the upstream routers (namely, the remaining MHRs 112 and FHR/RP 108) to also clear their locally-implemented buffers of the corresponding UDP datagrams. In this way, the techniques and system configurations of this disclosure enable the non-LHRs of network 110 to use buffering resources efficiently, while also providing the benefits of the reliable connection-oriented distribution tree formed from TCP connections 122.

As used herein, the term "locally-implemented buffers" include both TCP socket buffers as well as main buffers implemented in memory or storage devices of the routers of network 110. If LHRs 114 send a SACK message to indicate a gap in the sequence of UDP datagrams received over one of multicast flows, then MHRs 112C and 112D may continue to forward the encapsulated packets along respective TCP connections 122. In some buffering-based implementations, MHRs 112C and 112D check their locally-implemented buffers to determine whether the corresponding UDP datagram(s) of the gap is/are available. If not, then MHRs 112C and 112D forward the SACK message upstream, and the upstream forwarding is iterated until one of MHRs 112 or FHR/RP 108 determines that the UDP datagram(s) of the gap is/are available on a locally-implemented buffer. The first non-LHR of network 110, located in a bottom-up search from LHRs 114 to FHR/RP 108, that locates the UDP datagram(s) of the gap in a locally-implemented buffer, retransmits the IPC-encapsulated versions of the corresponding UDP datagram(s) over the connection-oriented distribution tree. That is, the non-LHRs of network 110 retransmit packets corresponding to all UDP datagrams from the last ACK message-acknowledged UDP datagram up to, but not including, the SACK-identified out-of-order UDP datagram.

Upon retransmitting the gap-filling UDP datagram(s) over the corresponding multicast flow 106 and receiving an ACK message indicating that LHRs 114 have received all of the UDP datagrams through the last SACK-identified UDP datagram, the retransmitting non-LHR of network 110 clears the retransmitted UDP datagram from all locally-implemented buffers. Thus, the routers of network 110 buffer UDP datagrams until receiving verification from LHRs 114.

In this way, the techniques of this disclosure improve reliability in delivery of UDP multicast datagrams over multicast flows 106 without modifying the end-user applications associated with multicast flows 106. Multimedia applications tend to cache voluminous amounts of data before processing the data. This is because the rate of data reception over a multicast distribution network is faster than the rate at which the data can be processed by a multimedia application. The discrepancy introduces backpressure and potential data loss, resulting in poor video/audio quality without added reliability in the multicast network. The techniques of this disclosure provide added reliability by leveraging unicast-based acknowledgement functionalities to fill in gaps in multicast UDP datagram delivery, to add reliability to the multicast distribution mechanism and to improve data precision As another example, the techniques of this disclosure coalesce multiple TCP connections 122 to back up the same multicast content delivered to each LHR 114 into one logical connection between FHR/RP 108 and each of sources 102, each of which can be considered a TCP server in the context of the connection-oriented distribution tree. The TCP connections terminate at LHRs 114 (in the form of (TCP connections 122A-D). FHR/RP 108 is an ingress router providing entry into the reliable connection-oriented distribution tree, and effectively sprays the data received from sources 102 over the reliable connection-oriented distribution tree to eventually reach LHRs 114, unless the corresponding UDP datagrams are acknowledged or corrective measures have been implemented to fill in any gaps. LHR 114 push the data on to the individual connections to serve interested receivers 118. Interested receivers 118 are agnostic to the precise mechanism by which data is received, network bandwidth is conserved in the order of the number of TCP connections that are coalesced.

By coalescing multiple TCP connections for the same content at LHR 114 into one connection between the FHR/RP 108 and the TCP server, the user end TCP connection terminates at LHR 114, and LHR 114 can then enter into a reliable multicast framework. LHR 114 may generate a new TCP connection with the TCP server to serve the request, and any data received from the TCP server will be sprayed on the reliable multicast channel to reach LHR 114. LHR 114 may push this data on to the individual TCP connections in the respective subnet. The application end points remain agnostic to how the data is received. These implementations save on the network bandwidth by an n-fold factor, where 'n' denotes the number of TCP connections that are coalesced. Example scenarios include a campus network and/or an internet service provider (ISP) network.

LHRs 114 reinject the complete multicast UDP datagrams at the kernel level, as if the complete multicast UDP datagram is received according to the locally-formed IIL. That is, LHRs 114 reinject the UDP datagrams of multicast flows 106 in the kernel, whether the UDP data datagram was received normally over the respective multicast flow 106, or was received over the respective multicast flow 106 in response to a SACK message-induced retransmission. From this point onwards, LHRs 114 use traditional IP multicast forwarding mechanisms to deliver the datagrams of multicast flows 106 to all of interested receivers that requested the (S, G) multicast flow associated with the pertinent multicast flow 106.

According to the techniques and system configurations of this disclosure, any two adjacent routers of network 110 implement the connection-oriented distribution tree using a single TCP connection 122 to reliably deliver datagrams for all of multicast flows 106 corresponding to every (S, G) tuple. Again, the TCP connection establishment portions of the techniques of this disclosure involve the non-LHRs of network 110 intercepting PIM join messages to create each TCP connection 122. If, for a given (S, G) tuple, the PIM join message points to an adjacent router for which a TCP connection 122 already exists, the respective multicast flow 106 corresponding to the new (S, G) is mapped to the existing TCP connection 122. No new TCP connection will be created in this case. In this way, the connection-oriented distribution tree of this disclosure adds reliability to multiple multicast flows 106 corresponding to different (S, G) tuples while reusing resources to improve efficiency and to consume minimal overhead.

Figure 2:
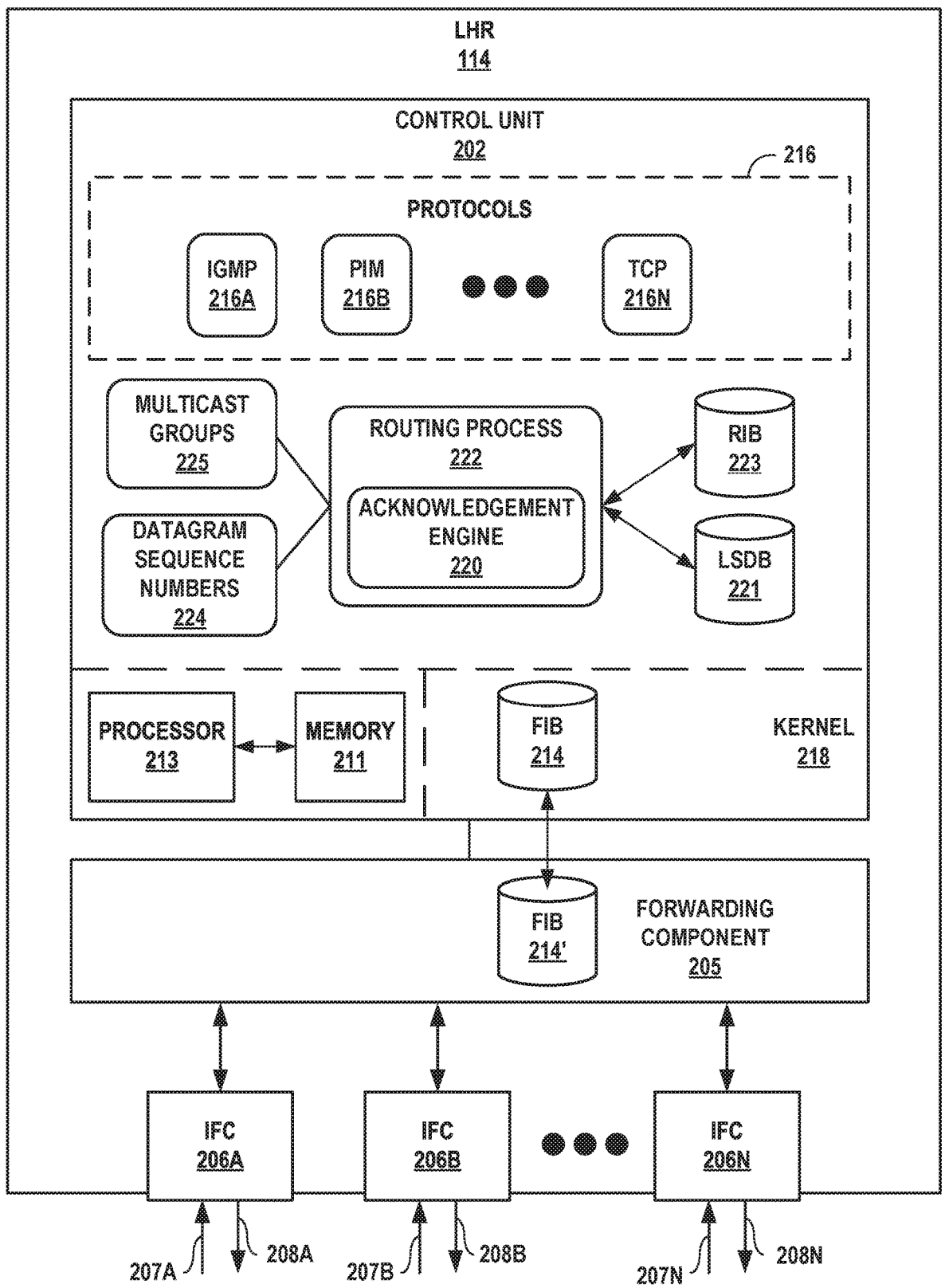
FIG. 2 is a block diagram illustrating an example of a last hop router shown in FIG. 1, according to one or more of the system configurations and techniques described in this disclosure.

FIG. 2 is a block diagram illustrating an example of an LHR 114 shown in FIG. 1, according to one or more of the system configurations and techniques described in this disclosure. Because LHR 114 represents an implementation that can be applicable to one or both of LHRs 114A and 114B shown in FIG. 1, LHR 114 is labeled in generic fashion in FIG. 2. LHR 114 includes a control unit 202 coupled to a forwarding component 205. LHR 114 includes interface cards 206A-206N ("IFCs 206") that receive packets via inbound links 207A-207N ("inbound links 207") and send packets via outbound links 208A-208N ("outbound links 208"). IFCs 206 includes interface ports (not shown) coupled to inbound links 207 and outbound links 208. While the example of LHR 114 shown in FIG. 2 has a bifurcated control plane and forwarding plane executed by separate hardware and/or software components, some example network devices that apply last-hop router techniques described in this disclosure may have a hardware and/or software components that perform both control plane and forwarding plane operations.

Control unit 202 provides a hardware environment that includes one or more programmable processors 213 coupled to one or more memory devices 211. Control unit 202 may further include a storage device (not shown), such as a disk drive. The hardware environment of control unit 202 executes the control plane for network device 200, which includes an operating system, including kernel 218, that provides a multi-tasking operating environment for execution of concurrent processes. Routing process 222, for instance, represents one or more processes that execute protocols 216 for sending and receiving routing, path setup, management, and/or configuration information for a network that includes network device 200. Protocols 216 in the illustrated example include Internet Group Management Protocol (IGMP) 216A, protocol independent multicast (PIM) 216B, and transmission control protocol (TCP) 216N. Other protocols not shown in the illustrated example may include RSVP-TE, Border Gateway Protocol (BGP), OSPF, IS-IS, UDP, and RIP, for instance.

Routing process 222 executes protocols to obtain routing information for storage to routing information base (RIB) 223 and Link-State Database (LSDB) 221 to reflect the current topology of a network and other network entities to which it is connected. RIB 223 and LSDB 221 may describe a topology of network 110 in which LHR 114 resides, and may also include routes through the shared trees (multicast and unicast) implemented over network 110. RIB 223 and LSDB 221 describe various routes within network 110, and the appropriate next-hops for each route, i.e., the neighboring router of network 110 along each of the described routes. In some cases, RIB 223 and/or LSDB 221 may simultaneously include routes and associated next-hops for multiple topologies, such as the default (shortest-path) topology over the multicast tree over which multicast flows 106 are delivered, as well as the topology for the unicast tree formed using TCP connections 122.

Routing process 222 and kernel 218 may process routing information included in RIB 223 and LSDB 221 to generate software forwarding information base (FIB) 214 that associates network destinations with specific next-hops and corresponding IFCs 206 and physical output ports for output links 208. Based on software FIB 214, kernel 218 programs forwarding component 205 to install the forwarding information as hardware FIB 214'.

Forwarding component 205 represents hardware and logic functions that provide high-speed forwarding of network traffic. Forwarding component 205 may include a set of one or more forwarding chips programmed with FIB 214' that maps network destinations and/or MPLS labels with specific next-hops and the corresponding output interface ports. In general, when LHR 114 receives a packet/datagram via one of inbound links 207, forwarding component 205 identifies an associated next-hop for the data packet by traversing FIB 214 based on information within the packet. Forwarding component 205 forwards the packet on one of outbound links 208 mapped to the corresponding next-hop in accordance with FIB 214. Forwarding component 205 may be a distributed plurality of forwarding components distributed among one or more line cards interconnected by a switch fabric.

FIB 214 may be a radix tree programmed into dedicated forwarding chips, a series of tables, a complex database, a link list, a radix tree, a database, a flat file, or various other data structures. FIB 214 may include specific routes to forward multicast traffic for a given multicast group to neighboring routing devices. In general, when LHR 114 receives a multicast packet (e.g., a UDP datagram) of one of multicast flows 106 via one of inbound links 207, forwarding component 205 determines a next-hop for the packet in accordance with FIB 214', and forwards the packet according to the next-hop.

Routing process 222 selects primary next-hops for a default routing topology. Routing process 222 may, for example, execute a Shortest Path First (SPF) calculation on the graph G representing a network topology for a graph that includes network device 200, with LHR 114 as the source S to compute a primary next-hop to all destination nodes in the graph G. This SPF calculation is denoted SPF(S, G). Routing process 222 may obtain information that makes up graph G from RIB 223 and/or LSDB 221. Calculating SPF(S, G) allows routing process 222 to obtain the optimal distance from S to all nodes in the network topology represented by graph G. In some examples, routing process 222 may select the next-hop having the optimal (e.g., lowest cost) distance as the primary next-hop, and install the selected primary next-hop to FIB 214.

Routing process 222 accesses datagram sequence numbers 224 and multicast groups 225. Routing process 222 may determine the 'G' value of the (*,G) tuple of a PIM join request based on the information available from multicast groups 225. Routing process 222 obtains sequence numbers for the UDP datagrams of the respective multicast flow 106 from datagram sequence numbers 224. Acknowledgement engine 220 of routing process 222 uses the information available from multicast groups 225 and datagram sequence numbers 224 to leverage the reliable connection-oriented distribution tree of this disclosure. For example, acknowledgement engine 220 may correlate the sequence number of a received UDP datagram and the 'G' value of the same UDP to determine whether the UDP datagram was received in order or out of order in the corresponding multicast flow 106 for the 'G' group.

If acknowledgement engine 220 determines, based on a cross-check against datagram sequence numbers 224, for a particular multicast group 225, that a particular UDP was indeed received in sequence, then acknowledgement engine 220 generates an ACK message to be transmitted and propagated upstream via LHR 114's upstream non-LHRs of network 110. That is, to determine that a UDP datagram was received in order, acknowledgement engine 220 determines that all UDP datagrams of the same multicast group 225 that have lower sequence numbers than the last-received UDP datagram have been received.

If, however, acknowledgement engine 220 determines that a UDP datagram was received out of order, then acknowledgement engine 220 generates a SACK message of this disclosure to be transmitted and propagated upstream via LHR 114's upstream non-LHRs of network 110. Acknowledgement engine 220 determines that a UDP datagram was received out of order if the corresponding datagram sequence number 224 is greater than the corresponding datagram sequence number(s) 224 of one or more UDP datagrams that have not yet been received with respect to multicast group 225, thereby creating a gap in the multicast flow 106 corresponding to the respective multicast group 225.

Upon receiving gap-filling UDP datagrams in response to sending a SACK message upstream, acknowledgement engine 220 may generate an ACK message for the last-received UDP datagram. More specifically, acknowledgement engine 220 may generate the ACK message based on a determination that the gap between the last-received UDP datagram and the UDP datagram of the last-generated ACK message has been filled completely, such as by retransmission in response to the SACK message.

Additionally, LHR 114 may implement the acknowledgement (ACK and SACK) functionalities of this disclosure to add reliability to the multicast distribution tree. MHR 114 may also implement the connection-oriented aspects of this disclosure over a single TCP connection 122, regardless of how many of multicast groups 225 to which LHR 114 is subscribed via the PIM registration process described above. In this way, the techniques and system configurations of this disclosure enable LHR 114 to implement the acknowledgement portions of the reliable connection-oriented datagram distribution of this disclosure efficiently, without introducing excess overhead in the form of multiple TCP connections.

In general, when LHR 114 receives a packet, forwarding component 205 may do a lookup of FIB 214' using the label of the received packet as a key. FIB 214' may return a set of next-hops, including the primary next-hop and any alternate next-hops. When a topology-id label is used, forwarding component 205 may do a lookup on the topology-id label to find the correct context and then use the next label of the received packet as a key and FIB 214' may return a set of next-hops that reflect the set of downstream interested receivers 118 subscribed to the respective multicast group 225 serviced by the multicast flow 106 that routing process 222 is currently processing.

The architecture of LHR 114 illustrated in FIG. 2 is shown for example purposes only. The disclosure is not limited to this architecture. In other examples, LHR 114 may be configured in a variety of ways. For instance, some of the functionally of control unit 202 and forwarding component 205 may be distributed within IFCs 206. As another example, operations ascribed to control unit 202 may be performed by forwarding component, and vice versa, or by a common hardware or operating environment. Routing process 222, forwarding component 205, or other component(s) of LHR 114 may re-program FIB 214' to forward UDP datagrams to interested receiver 118 regardless of the path by which the UDP datagrams were received at LHR 114.

Control unit 202 and forwarding component 205 may each be implemented solely in hardware, or may be implemented as combinations of hardware, software, or firmware. For example, one or more processors 213 may include processing circuitry to execute software instructions. As used herein, "processing circuitry" encompasses fixed function circuitry, programmable circuitry, or any combination of fixed function circuitry and programmable circuitry. In some cases, the various software modules and protocol of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, or processing circuitry to perform operations, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random-access memory (NVRAM), Flash memory, a hard disk, a CD-ROM, a floppy disk, a cassette, magnetic media, optical media, or other computer-readable storage media.

Figure 3:
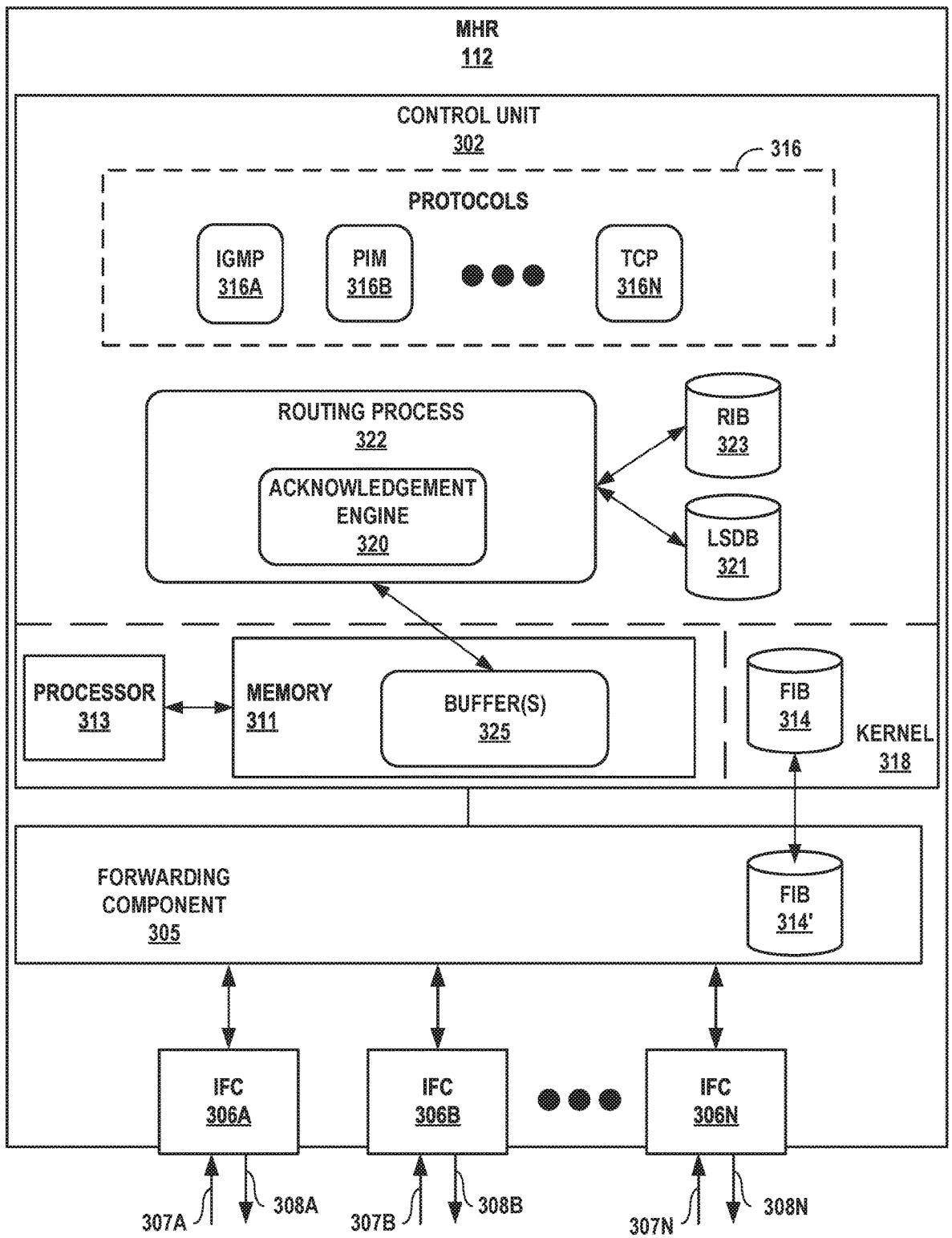
FIG. 3 is a block diagram illustrating an example of a mid hop router shown in FIG. 1, according to one or more of the system configurations and techniques described in this disclosure.

FIG. 3 is a block diagram illustrating an example of an MHR 112 shown in FIG. 1, according to one or more of the system configurations and techniques described in this disclosure. Because MHR 112 represents an implementation that can be applicable to one or more of MHRs 112A-D shown in FIG. 1, MHR 112 is labeled in generic fashion in FIG. 3. MHR 112 includes a control unit 302 coupled to a forwarding component 305. MHR 112 includes interface cards 306A-306N ("IFCs 306") that receive packets via inbound links 307A-307N ("inbound links 307") and send packets via outbound links 308A-308N ("outbound links 308"). IFCs 306 includes interface ports (not shown) coupled to inbound links 307 and outbound links 308. While the example of MHR 112 shown in FIG. 3 has a bifurcated control plane and forwarding plane executed by separate hardware and/or software components, some example network devices that apply last-hop router techniques described in this disclosure may have a hardware and/or software components that perform both control plane and forwarding plane operations. FHR/RP 108 may include components similar to MHR 112 shown in FIG. 3 and operate similarly.

Control unit 302 provides a hardware environment that includes one or more programmable processors 313 coupled to one or more memory devices 311. Control unit 302 may further include a storage device (not shown), such as a disk drive. The hardware environment of control unit 302 executes the control plane for network device 300, which includes an operating system, including kernel 318, that provides a multi-tasking operating environment for execution of concurrent processes. Routing process 322, for instance, represents one or more processes that execute protocols 316 for sending and receiving routing, path setup, management, and/or configuration information for a network that includes network device 300. Protocols 316 in the illustrated example include Internet Group Management Protocol (IGMP) 316A, protocol independent multicast (PIM) 316B, and transmission control protocol (TCP) 316N. Other protocols not shown in the illustrated example may include RSVP-TE, Border Gateway Protocol (BGP), OSPF, IS-IS, and RIP, for instance.

Routing process 322 executes protocols to obtain routing information for storage to routing information base (RIB) 323 and Link-State Database (LSDB) 231 to reflect the current topology of a network and other network entities to which it is connected. RIB 323 and LSDB 321 may describe a topology of network 110 in which MHR 112 resides, and may also include routes through the shared trees (multicast and unicast) implemented over network 110. RIB 323 and LSDB 321 describe various routes within network 110, and the appropriate next-hops for each route, i.e., the neighboring router of network 110 along each of the described routes. In some cases, RIB 323 and/or LSDB 321 may simultaneously include routes and associated next-hops for multiple topologies, such as the default (shortest-path) topology over the multicast tree over which multicast flows 106 are delivered, as well as the topology for the unicast tree formed using TCP connections 132.

Routing process 322 and kernel 318 may process routing information included in RIB 323 and LSDB 321 to generate software forwarding information base (FIB) 314 that associates network destinations with specific next-hops and corresponding IFCs 306 and physical output ports for output links 308. Based on software FIB 314, kernel 318 programs forwarding component 305 to install the forwarding information as hardware FIB 314'.

Forwarding component 305 represents hardware and logic functions that provide high-speed forwarding of network traffic. Forwarding component 305 may include a set of one or more forwarding chips programmed with FIB 314' that maps network destinations and/or MPLS labels with specific next-hops and the corresponding output interface ports. In general, when MHR 112 receives a packet/datagram via one of inbound links 307, forwarding component 305 identifies an associated next-hop for the data packet by traversing FIB 314 based on information within the packet. Forwarding component 305 forwards the packet on one of outbound links 308 mapped to the corresponding next-hop in accordance with FIB 314. Forwarding component 305 may be a distributed plurality of forwarding components distributed among one or more line cards interconnected by a switch fabric.

FIB 314 may be a radix tree programmed into dedicated forwarding chips, a series of tables, a complex database, a link list, a radix tree, a database, a flat file, or various other data structures. FIB 314 may include specific routes to forward multicast traffic for a given multicast group to neighboring routing devices. In general, when MHR 112 receives a multicast packet (e.g., a UDP datagram) of one of multicast flows 106 via one of inbound links 307, forwarding component 305 determines a next-hop for the packet in accordance with FIB 314', and forwards the packet according to the next-hop.

Routing process 322 selects primary next-hops for a default routing topology. Routing process 322 may, for example, execute a Shortest Path First (SPF) calculation on the graph G representing a network topology for a graph that includes network device 300, with MHR 112 as the source S to compute a primary next-hop to all destination nodes in the graph G. This SPF calculation is denoted SPF(S, G). Routing process 322 may obtain information that makes up graph G from RIB 323 and/or LSDB 321. Calculating SPF(S, G) allows routing process 322 to obtain the optimal distance from S to all nodes in the network topology represented by graph G. In some examples, routing process 322 may select the next-hop having the optimal (e.g., lowest cost) distance as the primary next-hop, and install the selected primary next-hop to FIB 314.

In the example of FIG. 3, MHR 112 implements one or more buffers 325 in memory 311. While illustrated in FIG. 3 as being a single structure for ease of illustration, buffer(s) 325 may represent one or both of a main buffer and/or one or more socket buffers of MHR 112. Buffer(s) 325 provide MHR 112 with the capability to retain copies of UDP datagrams received over multicast flows 106 and/or IPC-encapsulated UDP datagrams received over the reliable connection-oriented distribution tree of this disclosure. MHR 112 may store copies of the UDP datagrams or encapsulated UDP datagrams to buffer(s) 325 temporarily, to be purged pending confirmation that LHR 114 has received the buffered UDP datagrams in order or in corrected (gap-filled) order.

Acknowledgement engine 320 of routing process 322 is configured to process ACK and/or ACK messages received, whether directly or indirectly, from downstream LHR 114. If acknowledgement engine 320 processes a ACK message indicating that LHR 114 has received a UDP datagram of one of multicast flows 106 in order, then acknowledgement engine 320 may cause routing process 322 to cease forwarding of the encapsulated UDP datagrams over the connection-oriented distribution tree. In buffering-based implementations, acknowledgement engine 322 clears, from buffer(s) 325, all copies of the acknowledged datagram as well as any lower sequence-numbered datagrams of the same multicast flow 106.

If, however, in a buffering-based implementation of the described techniques, acknowledgement engine 320 receives a SACK message indicating that LHR 114 has received a UDP datagram of the multicast flow 106 out of order, then routing process 322 pushes all UDP datagrams currently stored to buffer(s) 325 for the multicast flow 106 to FIB 314' to be forwarded to LHR 114. Because all previous UDP datagrams that were confirmed via ACK messages to have been received in order at LHR 114 have been cleared from buffer(s) 325 in response to the ACK messages, the only remaining datagrams stored to buffer(s) 325 are datagrams that represent the gap in datagram receipt at LHR 114, as well as the SACK-invoking datagram that was last received at LHR 114. Upon receiving a ACK for either the datagram that triggered the SACK message, or for a datagram that has a higher sequence number than the datagram that triggered the SACK message, acknowledgement engine 320 may purge buffer(s) 325 of all stored datagrams for the corresponding multicast flow 106.

In general, when MHR 112 receives a packet, forwarding component 305 may do a lookup of FIB 314' using the label of the received packet as a key. FIB 314' may return a set of next-hops, including the primary next-hop and any alternate next-hops. When a topology-id label is used, forwarding component 305 may do a lookup on the topology-id label to find the correct context and then use the next label of the received packet as a key and FIB 314' may return a set of next-hops. Routing process 322, forwarding component 305, or other component(s) of MHR 112 may re-program FIB 314' to forward UDP datagrams to LHR 114 for eventual delivery to the content consumer represented by interested receiver 118. For example, routing process 322 may install the forwarding information to FIB 314 for configuration by kernel 318 to forwarding component 305 as FIB 314'.

The architecture of MHR 112 illustrated in FIG. 3 is shown for example purposes only. The disclosure is not limited to this architecture. In other examples, MHR 112 may be configured in a variety of ways. For instance, some of the functionally of control unit 302 and forwarding component 305 may be distributed within IFCs 306. As another example, operations ascribed to control unit 302 may be performed by forwarding component, and vice versa, or by a common hardware or operating environment.

Control unit 302 and forwarding component 305 may each be implemented solely in hardware, or may be implemented as combinations of hardware, software, or firmware. For example, one or more processors 313 may include processing circuitry to execute software instructions. As used herein, "processing circuitry" encompasses fixed function circuitry, programmable circuitry, or any combination of fixed function circuitry and programmable circuitry. In some cases, the various software modules and protocol of control unit 302 may comprise executable instructions stored, embodied, or encoded in a computer-readable medium, such as a computer-readable storage medium, containing instructions. Instructions embedded or encoded in a computer-readable medium may cause a programmable processor, or other processor, or processing circuitry to perform operations, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random-access memory (NVRAM), Flash memory, a hard disk, a CD-ROM, a floppy disk, a cassette, magnetic media, optical media, or other computer-readable storage media.

Figure 4:
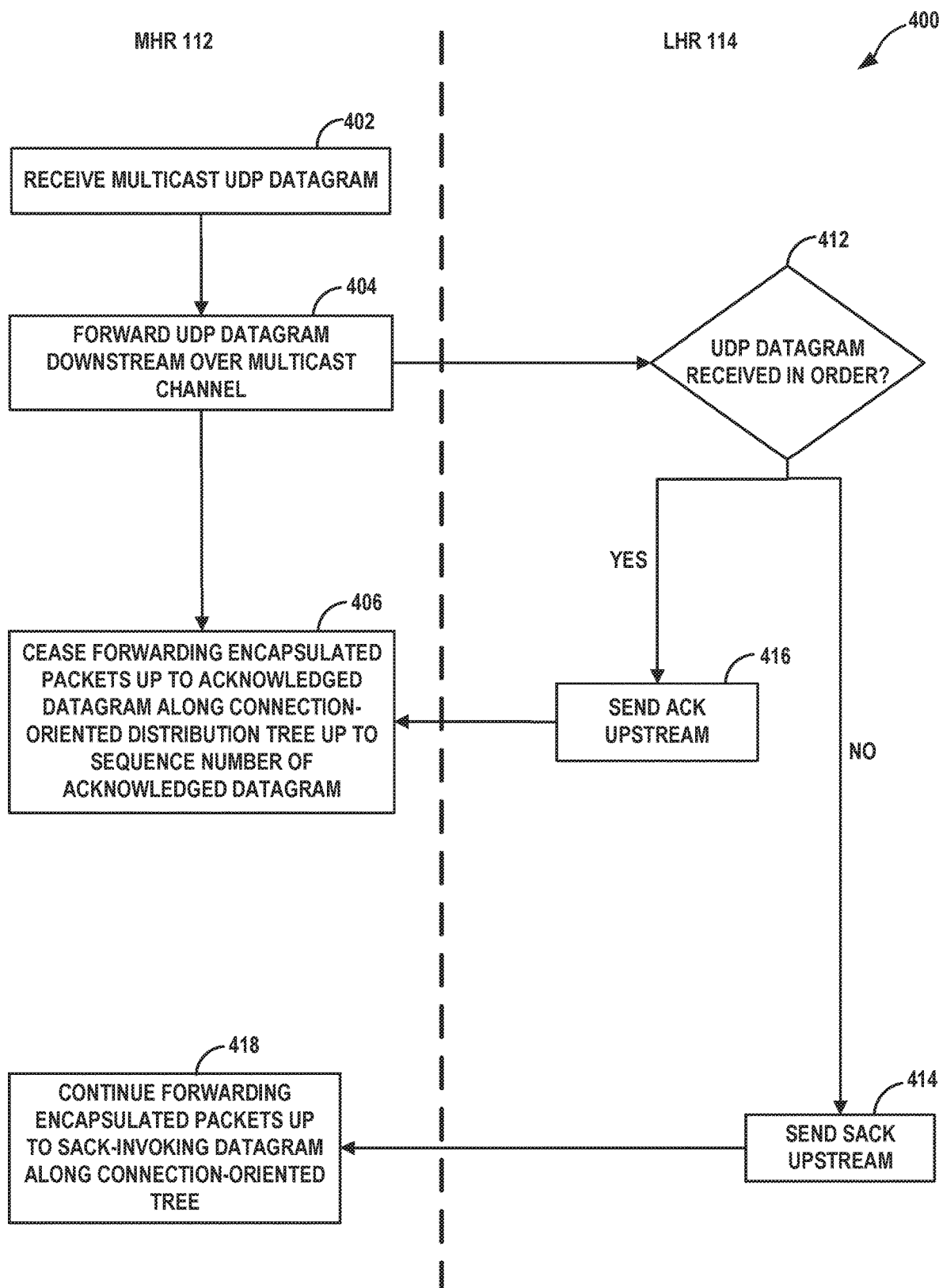
FIG. 4 is a flowchart illustrating an example process by which a last hop router and a non-last hop router may use the parallel connection-oriented distribution tree of this disclosure to enhance reliability over a corresponding multicast distribution tree.

FIG. 4 is a flowchart illustrating a process 400 by which MHR 112 and LHR 114 may use the connection-oriented distribution tree of this disclosure to enhance reliability over a corresponding multicast distribution tree. In the context of process 400, MHR 112 and LHR 114 may be adjacent-hop routers of network 110, or may be indirectly connected via the message propagation of the PIM registration process. Process 400 may begin when MHR 114 receives a UDP datagram of one of multicast flows 106 (402). MHR 112 may forward the UDP datagram downstream over the multicast channel 225 that corresponds to the particular multicast flow 106 (404). MHR 112 may buffer the UDP datagram locally (406). For example, MHR 112 may store the UDP datagram to buffer(s) 325 implemented in memory 311.

LHR 114 may determine whether or not the UDP datagram forwarded by MHR 112 was received in order (decision block 412). LHR 114 may make this determination based on whether or not the UDP datagram was received in order based on whether all UDP datagrams of the same multicast flow 106 with lower sequence numbers than the current datagram have already been received at the time of receiving the current datagram. If LHR 114 determines that the current datagram was received out of order ("NO" branch of decision block 412), LHR 114 may send a SACK message of this disclosure upstream to MHR 112 (414). On the other hand, if LHR 114 determines that the current datagram was received in order ("YES" branch of decision block 412), LHR 114 may send an ACK message upstream to MHR 112 (416).

In response to receiving an ACK message from LHR 114, MHR 112 may cease forwarding encapsulated packets along the respective TCP connection 122 of the connection-oriented tree up to the sequence number of the ACK-invoking datagram for the particular multicast flow 106 (406). That is, because LHR 114 has acknowledged in-order receipt of all UDP datagrams (up to date) for the particular multicast flow 106, MHR 112 determines that the redundant transmission of the (encapsulated) UDP datagrams corresponding to the particular multicast flow 106 is unnecessary, because LHR 114 has already acknowledged in-order receipt of all of the UDP datagrams (up to date) for the particular multicast flow 106. In some examples, MHR 112 may update a locally-maintained record to reflect that all UDP datagrams up to the ACK-inducing have been received, based on their respective sequence numbers.

In response to receiving a SACK message from LHR 114, MHR 112 may continue forwarding encapsulated packets corresponding to UDP datagrams up to the SACK-invoking UDP datagram and beyond, downstream via the connection-oriented distribution tree (418). In some examples, MHR 112 may update a locally-maintained record to reflect that at least one of the UDP datagrams up to the ACK-inducing has not been received, based on the respective sequence number(s) being missing from the full set of ACKs received from LHR 112. In various examples, MHR 114 may update the locally-maintained record to reflect in-order receipt of a UDP datagram based on either receiving ACKs from all LHRs 112 on the downstream path(s) comprising the respective downstream TCP connection 122. In these examples, MHR 114 may or based on receiving a SACK from at least one of LHRs 112 on the downstream path(s) comprising the respective downstream TCP connection 122.

Aspects of this disclosure can also be applied to live TCP streaming applications. For instance, the routers of network 110 may map multiple requests from different subnets for a given TCP live streaming into single multicast group (e.g., as associated with one of multicast flows 106). In this example, the multicast distribution tree begins at the data streaming source (e.g., one of sources 102), and ends at the respective gateway serving the subnet. A single TCP connection is formed between the source and the gateway, and the single TCP connection is associated with a multicast group (as associated with one of multicast flows 106 by the 'G' value of the PIM tuple described above). In this implementation, the TCP connection from the live streaming source (the respective source 102) terminates at FHR/RP 108, and the TCP connections from each host terminate at the respective LHR 114. Once the data is received over the reliable connection-oriented distribution tree at the respective LHR 114, the respective LHR 114 sprays the data into each TCP connection (to the pertinent interested receivers 118).

According to some aspects of this disclosure, the routers of network 110 may further enhance process 400 to relieve backpressure created over TCP connections 122 of the connection-oriented tree. Any given router of network 110 may mitigate or potentially avoid the buildup of locally-cached TCP data by selecting a congestion correction algorithm. In the case of a packet drop, the respective non-LHR of network 110 retransmits data over the multicast distribution tree without setting a congestion window to one, using TCP Westwood or the like. If two adjacent routers of network 110 experience congestion, the techniques of this disclosure may enable the routers to self-correct by rebuild their portion of the connection-oriented tree by directly connecting to the children of the congested router (i.e. by establishing one of TCP connections 122 directly to a grandchild router, or next-to-next-hop router).

In some cases, such as in worst case scenarios, the routers of network 110 may remove the path represented by the respective TCP connection 122 of the congested non-LHR from a given upstream non-LHR of network 110, and may construct the TCP channel on this given path again. During the process of connection-oriented tree repair, the non-LHRs of network 110 may send the data for the multicast segment only via the multicast distribution tree. In this way, this disclosure also provides backpressure-alleviating enhancements that deal with downstream congestion issues.

Figure 5:
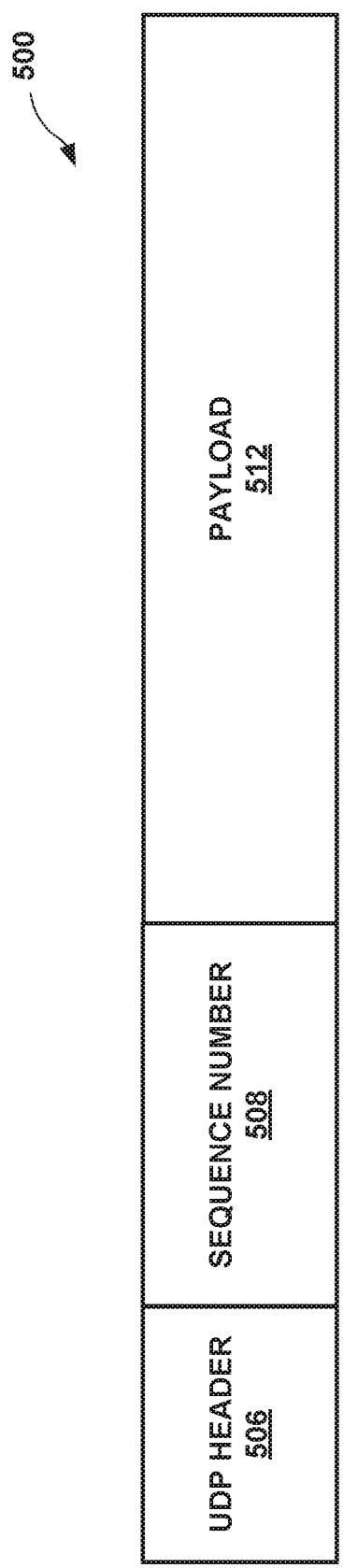
FIG. 5 is a conceptual diagram illustrating the structure of a UDP datagram of this disclosure.
Figure 6:
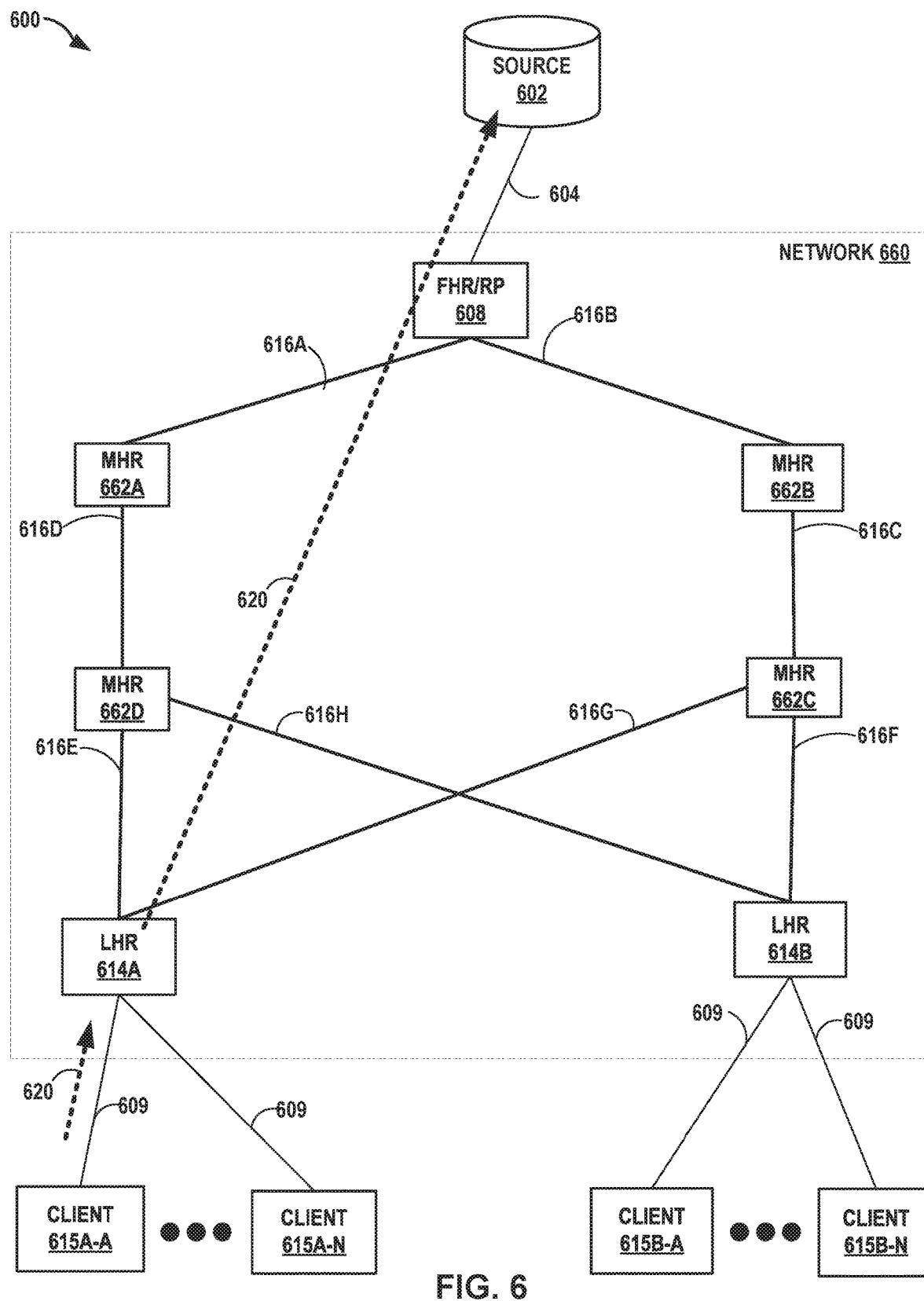
FIGS. 6-9 are block diagrams illustrating examples of content delivery using a reliable multicast network, according to techniques described in this disclosure.

FIG. 5 is a conceptual diagram illustrating the structure of a UDP datagram 500 of this disclosure. FHR/RP 108 may form UDP datagram 500 in a way that enables LHRs 114 to determine whether UDP datagram 500 was received in order or out of order within the respective multicast flow 106. FHR/RP 108 forms UDP datagram 500 include a payload 512 encapsulated within a UDP header 506. In accordance with the techniques of this disclosure, FHR/RP 108 embeds sequence number 508 between UDP header 506 and payload 512.

Sequence number 508 is specific to the particular multicast flow 106 to which UDP datagram 500. Sequence number 508 indicates the order in which UDP datagram 500 should be received at LHR 114 over the respective multicast flow 106. LHR 114 uses sequence number 508 to determine whether the UDP datagrams of the particular multicast flow 106, up until receipt of UDP datagram 500 have been received in sequence, or there are any gaps in the receipt of the UDP datagrams of the particular multicast flow 106 until the receipt of UDP datagram 500.

FIGS. 6-9 are block diagrams illustrating content delivery using a reliable multicast network, according to techniques described in this disclosure. System 600 includes network 660, server 602, and clients 615. Network 660 may represent an example instance of network 110 of FIG. 1. FHR/RP 608, MHRs 662A-662D, LHRs 614A-614B, and links 616A-616H represent examples of similarly named elements from network 110.

Server 602 is a content server and transmits content to clients using the TCP, UDP, or other transport protocol for application sessions. Applications may include FTP, HTTP streaming, UDP streaming, file services, backup services, software upgrades, other audio/video streaming, and other content delivery. Typically, requests for content are received by server in an application-level protocol that specifies a content identifier for the content, such as a Uniform Resource Identifier (URI) or a file name resolvable by the server. In response to a content request from a client 615, server 602 begins transmitting the requested content to the receiver client 615. In some cases, server 602 may transmit content to a receiver client 615 not in response to a request from client 615. In either case, server 602 and the receiver client 615 both have an application session and a transport session for transmitting/receiving the content. The application session can be an HTTP session, an FTP session, etc.

Clients 615A-A though 615B-N ("clients 615") represent computing devices that are potential clients of server 602 for services provided by server 602. Clients 615 may include network devices, workstations, compute devices/servers, or other computing devices. Clients 615 may request and receive services from server 602 in the form of content delivered to clients 615. Such content may include content corresponding to the applications listed above with respect to application sessions engaged in by server 602.

In the illustrated example, client 615A-A on a network segment connected to LHR 614A issues content request 620 to server 602, which network 660 forwards to server 602. Content request 620 includes a content identifier and also includes a server identifier that indicates server 602, e.g., an IP address of server 602 in a destination address field of the IP header for content request 620, or a URI for server 602 in an application level protocol header for server 602. For a TCP session between client 615A-A and server 602, the client and server may have already performed the three-way handshake, and the content request 620 may be a request to initiate an application session in application data sent via the TCP session. For UDP-based packet delivery, while UDP is not a connection-oriented protocol and does not have session initiation capabilities, content request 620 may be sent by client 615A-A using a session setup protocol, such as Session Initiation Protocol (SIP). As such, content request 620 may include one more SIP messages or other session setup protocol messages for initiating an application session and corresponding content delivery of application data using UDP. Starting a new application session may include authenticating a client 615 to server 602.

LHR 614A intercepts content request 620 and identifies an application session for the content request 620. For example, LHR 614A may process the application level protocol header for content request 620 to obtain a session identifier for the application session. The session identifier may include or otherwise be based on both a content identifier and a server identifier for server 602. The session identifier in some examples may include an application identifier, such as a cookie or other handler that the application uses to deliver content to the correct session.

Having obtained a session identifier for the application session, LHR 614A determines, from a session table that lists existing sessions in the network 660 and in some cases maps the sessions to multicast (*, G) and/or (S, G), whether an existing multicasting session for this session identifier is in progress in network 660, whereby server 602 is outputting content for a similar application session having the same session identifier and network 660 is delivering the content to a different client 615, i.e., other than client 615A-A.

With no such application session being in progress, LHR 614A forwards content request 620 toward server 602 to cause server 602 to begin sending content via network 660 to client 615A-A. In addition, network 660 initiates a new multicast session for the application session. (In some examples, network 660 initiates a new multicast session for the application session only if more than one LHR 614 is connected to a client 615 for the application session. In other words, only if server 602 is to send the same content to multiple LHRs 614.)

Figure 7:
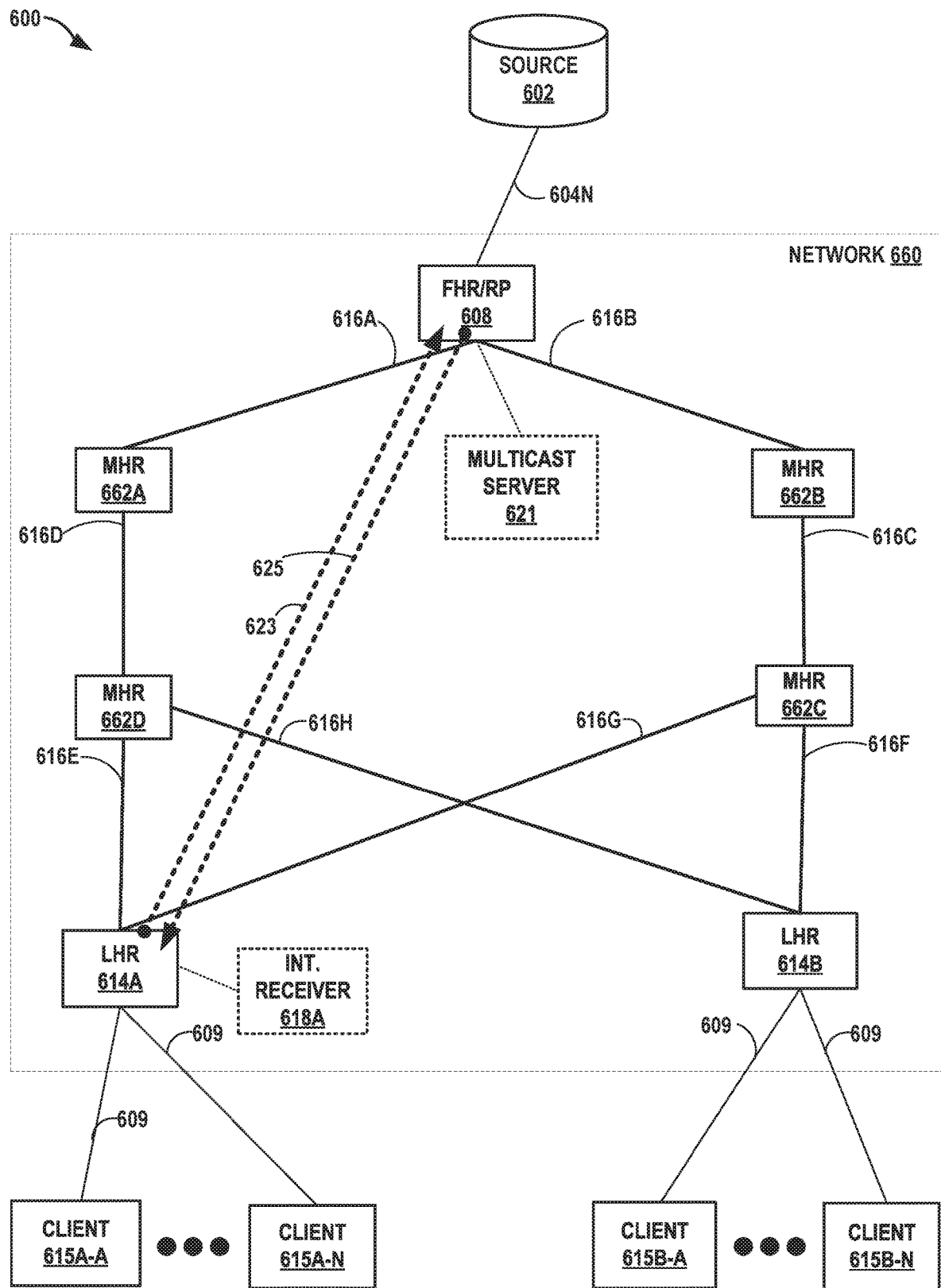

As illustrated in FIG. 7, to initiate the new multicast session for an application session, LHR 614A sends a multicast group request 623 to FHR/RP 608. Multicast group request 623 may represent a proprietary protocol message sent to a designated port for multicast group request/response/notification traffic. Multicast group request 623 and other multicast group traffic described herein may be other types of protocol messages. Multicast group request 623 may include the session identifier for the application session. Multicast group request 623 may include transport session information such as source and/or destination network addresses for the transport session (usable by FHR/RP 608 for identifying the unicast content to be encapsulated for multicast). FHR/RP 608 receives multicast group request 623 and starts a multicast server 621 to source content to be delivered using a multicast distribution tree for a new multicast group G sourced by source S of the FRH/RP 608, the multicast distribution tree being identified by (S, G). The multicast distribution tree is not shown for ease of illustration purposes.

FHR/RP 608 may store an association of the session identifier with the (S, G). FHR/RP 608 additionally sends a multicast group response 625 acknowledging the multicast group request 623. Multicast group response 625 may include the multicast group G address and may in some cases include the source address, S, for multicast server 621 executed by FHR/RP 608. FHR/RP 608 may create a new multicast group, G, for new multicast content. G may also be the destination address for multicast packets encapsulating unicast traffic received from source 602. Source 602 may be similar to any of sources 102 of FIG. 1.

FHR/RP 608 may be a network device having components similar to other routers described in this disclosure. For example, FHR/RP 608 may be similar to MHR 112 of FIG. 3. However, FHR/RP 608 may also include a multicast server, an intercept module such as a netfilter hook installed in the kernel for intercepting unicast traffic for application sessions from source 602, and tables for mapping intercepted unicast traffic to a multicast group (for reliable multicasting according to techniques described in this disclosure. Details regarding a netfilter hook are described elsewhere in this disclosure.

LHR 614A receives multicast group response 625 and may send a PIM join request identifying (*, G) or (S, G) to FHR/RP 608 to request to join the multicast distribution tree for (S, G) to begin receiving multicast content sourced by multicast server 621. At this point, LHR 614A is an interested receiver 618A for (S, G). LHR 614A may execute a dedicated routine or application to receive and handle the multicast content. LHR 614A maps the (S, G) to the application session (for content request 620) and stores this mapping to its session table.

LHR 614A creates a mapping for the multicast content (S, G) to client 615A-A. The mapping may be a forwarding next hop, a table, map, or other data structure. In response to receiving multicast content via the multicast distribution tree for (S, G), LHR 614A looks up the mapping to identify any clients of a server for source 602 that have previously requested to receive the unicast content sent by the server and distribution using multicast by network 660 (described in further detail below). As used herein, source 602 may refer to the server that serves as the source for requested content. LHR 614A removes any multicast encapsulation and forwards the unicast content to client 615A-A. This may include rewriting the IP header for the unicast content to specify that client 615A-A is a destination for the unicast content.

Figure 8:
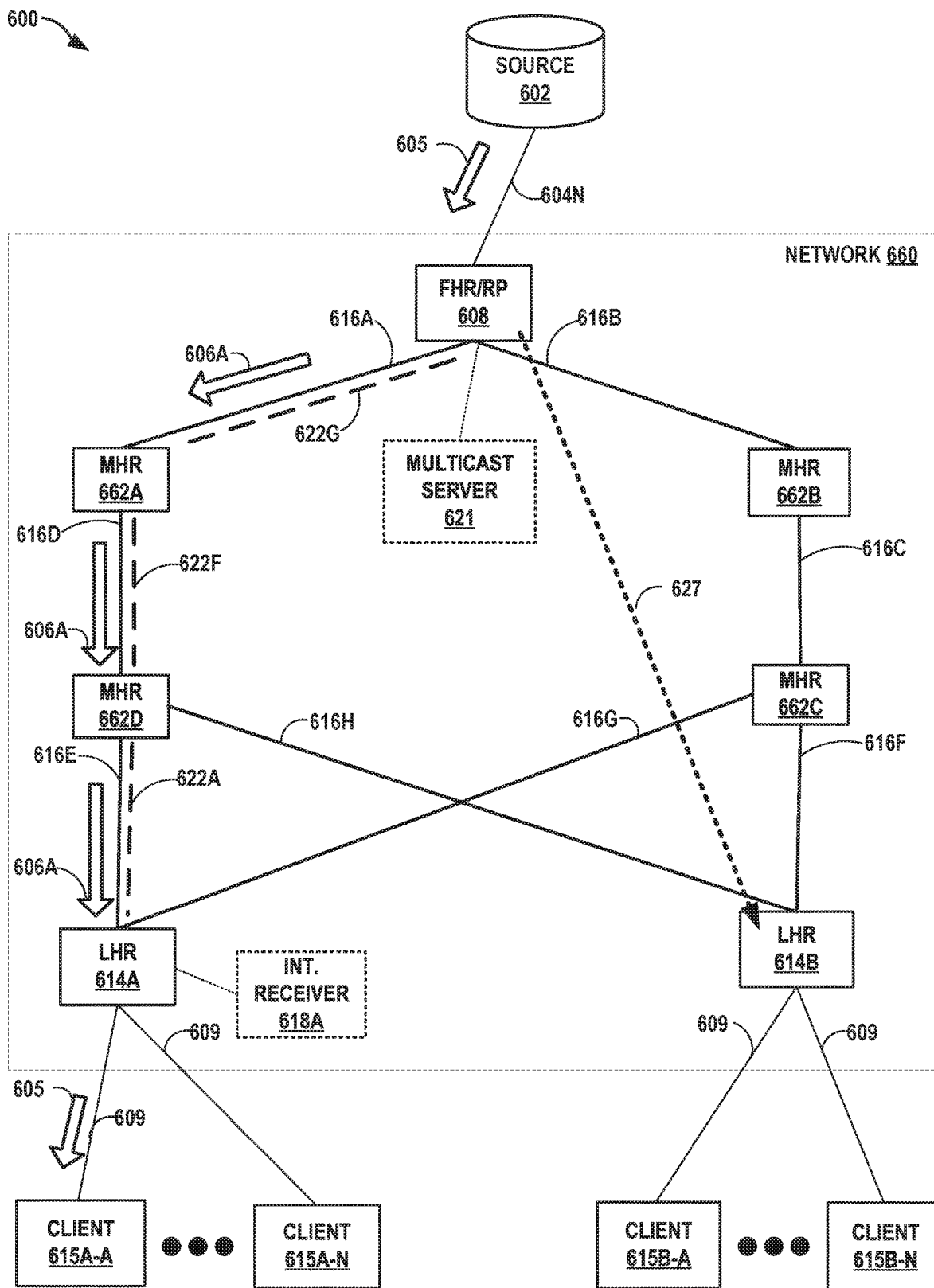

FHR/RP 608 also sends multicast group notification 627 (as shown in FIG. 8) to other LHRs 614 of which FHR/RP 608 may be aware. FHR/RP 608 may be configured with network addresses for multiple different LHRs 614. FHR/RP 608 may also record network addresses for any LHR 614 from which it receives a multicast group request, such as by recording the network address for LHR 614A included in multicast group request 623. Multicast group notification 627 may include the (S, G) for the multicast group and multicast distribution tree and may also include the session identifier. LHRs 614 receive instances of multicast group notification 627 and may then use the information included in multicast group notification 627 to map and send unicast traffic encapsulated within (S, G) multicast traffic to any clients 615 that have requested or are otherwise to receive content corresponding to the session identifier, e.g., the same content from server 602.

As illustrated in FIG. 8, besides creating a multicast distribution tree in accordance with standard PIM and other multicast techniques, the routers of network 660 use connection-oriented distribution techniques described above with respect to FIGS. 1-5 to create a parallel connection-oriented distribution tree implemented in parallel to the multicast distribution tree, and to distribute unicast traffic received by FHR/RP 608 and encapsulated as multicast traffic to interested receivers 618, which is only interested receiver 618A in FIG. 8. FIG. 8 illustrates a parallel, connection-oriented distribution tree that includes TCP connections 622A, 622F, and 622G, these three TCP connections together connecting FHR/RP 608 to LHR 614A having interested receiver 618A.

FHR/RP 608 receives unicast traffic 605 (i.e., traffic that is destined for a non-multicast network address). Unicast traffic 605 includes network packets destined for one of clients 615, such as client 615A-A (server 602 and client 615A-A having a transport and application layer session with one another in this instance). Multicast group request 623 (as shown in FIG. 7) may include a source address of the server 602 sourcing the content for the application session, and may also include a destination address that is an address of the first client to request the content (the client 615 with which the server 602 is having the application session). FHR/RP 608 may store an association of the source address, destination address pair with the multicast group to identify unicast traffic 605 to be multicast using the multicast group and parallel connection-oriented distribution tree. FHR/RP 608 encapsulates unicast traffic 605 in multicast flow 606A to be sourced by multicast server 621 executed by FHR/RP 608. For example, for each unicast packet received in unicast traffic 605, FHR/RP 608 may add an IP header that includes a destination address for the multicast group and that is within the multicast range for the IP address space (IPv4 or IPv6 for instance). This added IP header may be referred to as a multicast header. This generates multicast packets that make up multicast flow 606A. As described above with respect to FIGS. 1-5, for each packet in multicast flow 606A, FHR/RP may add a sequence number between the UDP header for the original unicast packet and the payload, and replicates the UDP datagram (with the embedded sequence number) for downstream transmission over the multicast distribution tree to MHRs 662. Alternatively, FHR/RP 608 may add this sequence number between the new IP header for multicast and the original IP header for the received unicast packet. Routers of network 660 are configured to identify a location of the sequence number within packets of multicast flows. Packets of multicast flows generated in this way include a bit in the outermost IP header, for instance, to indicate that the packets include a sequence number.

FHR/RP 608 may also encapsulate each UDP datagram (including its IP header) by adding an inter-process communication (IPC) header outside of the UDP header. Where there are multiple multicast flows sourced by multicast server 621, the sequence number that FHR/RP 608 embeds between the UDP header and the payload is specific to each multicast flow and indicates the order in which the corresponding UDP datagram should be received over respective multicast flow 606A. LHRs 614 use the sequence number to determine whether the UDP datagrams up till a certain point of time have been received in sequence, or there are any gaps in the receipt of the UDP datagrams.

FHR/RP 608 sends each IPC-encapsulated UDP packet, with the added sequence number, downstream to the pertinent LHR(s) 614 over the TCP connections 622 for the connection-oriented distribution tree implemented in parallel to the multicast distribution tree. In the example of FIG. 8, there are TCP connections connecting FHR/RP 608 to MHR 662A, MHR 662A to MHR 662D, MHR 662D to LHR 614A for the connection-oriented distribution tree. In addition to a multicast UDP-over-IP datagram (e.g., encapsulated UDP datagram with the added sequence number) being sent over any of TCP connections 622, the following metadata is added to the original multicast datagram that is communicated over the multicast distribution tree: {UDP seq no., (S, G)}. Each router of network 660 may, when a TCP segment is received, read the (S, G) tuple from the metadata to determine the next TCP socket to which this multicast datagram should be copied. As such, the non-LHRs of network 660 encapsulate multicast IP datagrams with the metadata specified in this disclosure, and then sending the encapsulated UDP datagrams downstream over the TCP connections 622.

FHR/RP 608 forwards the IPC message (which is a multicast UDP datagram encapsulated with an IPC header) over TCP connection 622G downstream to MHR 662A based on a relevant entry in the reliable multicast forwarding table. If FHR/RP 608 receives an acknowledgement (or "ACK") message from MHR 662A, then FHR/RP 608 purges all local buffers (whether a local buffer or a TCP socket buffer) of the corresponding IPC-encapsulated UDP datagrams.

MHRs 662 operate similarly to MHRs 112 to propagate and ensure reliability of multicast flow 606A to LHR 614A as an interested receiver 618A. In this way, the routers of network 660 propagate IPC messages that include multicast UDP datagrams from FHR/RP 608 to LHRs 614 in parallel with the corresponding multicast flow 606A, to the extent that a downstream non-LHR of network 660 did not receive an ACK for the corresponding sequence number-based UDP datagram of the multicast flow 606A. In this way, the parallel connection-oriented distribution tree of this disclosure provides a backup mechanism to the multicast flows that provides reliability while minimizing buffering costs to reduce packet loss stemming from multicast overburdening.

The third phase of implementing the reliable connection-oriented distribution techniques of this disclosure is described herein as a UDP datagram decapsulation phase. The UDP datagram decapsulation of the described techniques involves LHRs 614 serving a dual purpose of being a TCP endpoint, and thereby receiving the IPC messages corresponding to the UDP datagrams of multicast flows 606, such as multicast flow 606A. LHRs 614 remove or "strip" the IPC headers of the IPC packets received over TCP connections 622. LHRs 614 may recreate or recover the complete UDP datagram (with the sequence number added by FHR/RP 608) by modifying a TTL field in the IPC header, and by updating an IP checksum.

LHRs 614 decapsulate the UDP datagrams received over multicast flows to obtain the sequence number of each UDP datagram. Again, the sequence number is a value that FHR/RP 608 adds, to indicate the sequential placement of the UDP datagram in the multicast flow. LHRs 614 generate an acknowledgment (or ACK) message and transmit the ACK message upstream to confirm receipt of each UDP datagram, provided that all previous UDP datagrams, as indicated by prior sequence numbers, have also been received. MHRs 662 forward any ACK messages originated by LHRs 664 upstream, enabling the non-LHRs of network 660 to cease forwarding of the corresponding TCP packets that encapsulate the UDP packets with the same sequence numbers along the same (S, G) flow.

Conversely, LHRs 614 may detect a missing UDP datagram, based on a gap in the sequence numbers of the UDP datagrams received via multicast flows. If LHRs 614 detect a gap in the sequence of UDP datagrams based on receiving a UDP datagram of later sequence number without having received UDP datagrams of one or more prior or intervening sequence numbers, LHRs 614 generate a "selective acknowledgment" or SACK message with respect to the UDP datagram that is received out of order. LHRs 614 transmit any generated SACK messages upstream to report the gap in sequence, thereby alerting one or more non-LHRs of network 660 to possible packet loss, delay, or other malfunction of the multicast distribution tree with respect to the pertinent multicast flow, as identified by the (S, G) tuple embedded in the UDP datagrams.

LHR 614A receives packets of multicast flow 606A that include a unicast packet of unicast traffic 605 encapsulated by a UDP header for a multicast flow 606A and further encapsulated by a TCP header for TCP connection 622A. LHR 614A strips the TCP headers to restore the UDP datagram, as described above, and to perform reliability operations such as ACK/SACK for the parallel connection-oriented distribution tree. Because LHR 614A operates as interested receiver 618A for multicast flow 606A, LHR 614A further strips the UDP header for the multicast flow 606A packet to obtain the unicast packet of unicast traffic 605. LHR 614A maps the (S, G) information from the UDP header for the multicast flow 606A to identify any clients 615 to which the unicast packet of unicast traffic 605 should be forwarded. In this case, only client 615A-A is mapped to the (S, G) multicast group and is a client of server 602. LHR 614A therefore sends the unicast packet for unicast traffic 605 to client 615A-A. In some cases, each client 615 mapped to the (S, G) multicast group also destination information for an IP header. LHRs 614 in such cases may recreate an IP header for the unicast packet for unicast traffic 605 to include, for instance, a destination network address for the client 615 to which the unicast packet is to be sent, to ensure the client 615 receives the unicast packet for the application.

After creating a new multicast group to deliver, using multicast and a parallel connection-oriented distribution tree, unicast traffic 605, FHR/RP 608 sends a mapping of the session identifier for the application session to the new multicast group. For example, FHR/RP 608 may send, to LHR 614B and any other last hop router 614 or edge router 614 known to FHR/RP 608, a notification message 627 that includes a mapping of the session identifier to (S, G) for the multicast flow 606A. LHR 614B stores the mapping of the session identifier to (S, G) to a session table. Message 627 may represent a proprietary protocol message sent to a designated port for multicast group request/response/notification traffic. Message 627 may be another type of protocol message.

Figure 9:
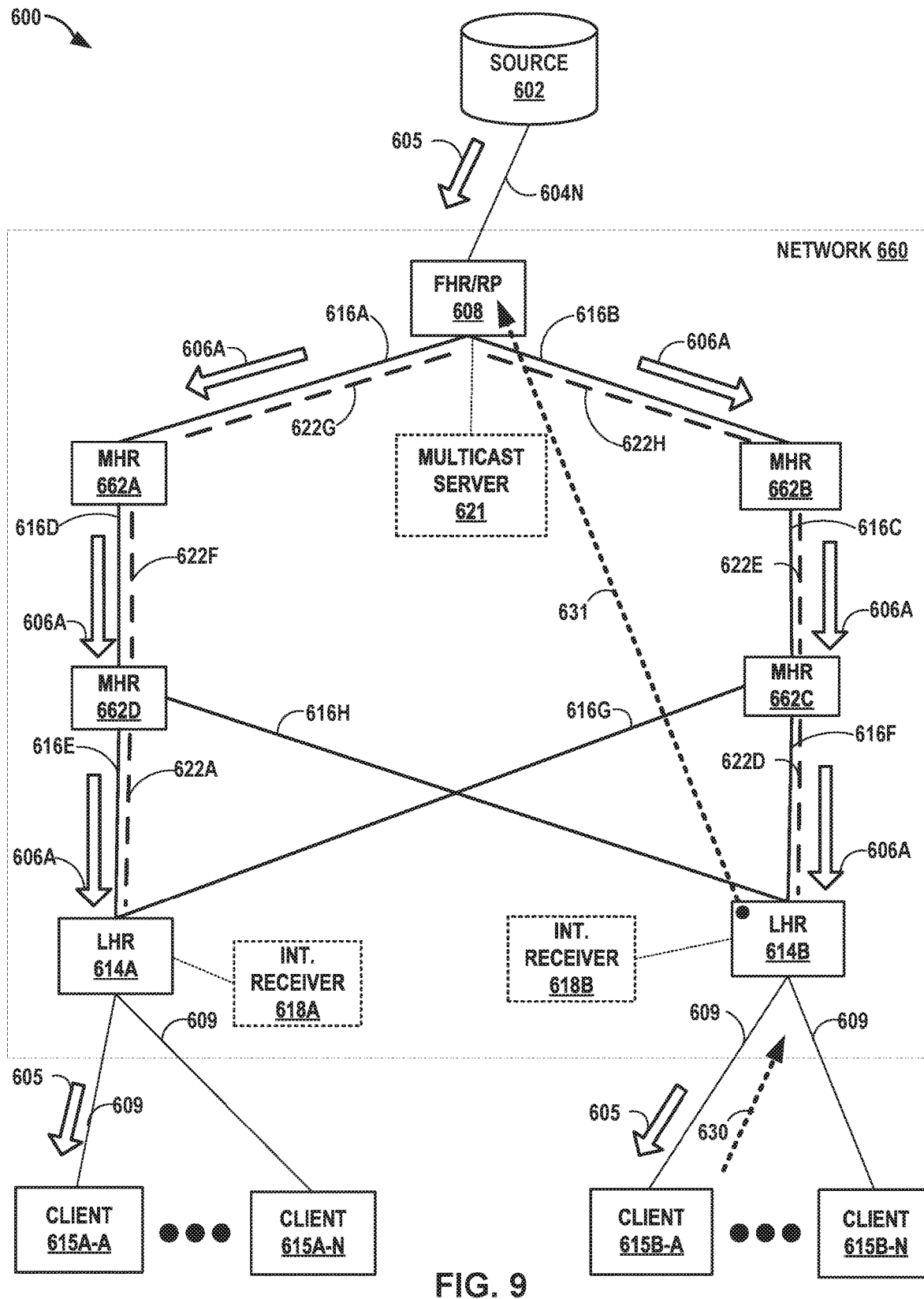

As illustrated in FIG. 9, client 615B-A on a network segment connected to LHR 614B issues content request 630 to server 602. Content request 630 may be similar to content request 620 in that it includes a request for the same content identifier and also includes the server identifier that indicates server 602. Content request 630 may be otherwise similar to content request 620.

Similar to LHR 614A and content request 620, LHR 614B intercepts content request 630 and identifies an application session for the content request 630. For example, LHR 614B may process the application level protocol header for content request 630 to obtain a session identifier for the application session. LHR 614B queries its session table to determine whether there is an existing mapping for the session identifier to a multicast distribution tree. In this case, the query matches on the mapping received in notification message 627, the mapping of the session identifier to (S, G) for the multicast flow 606A.

LHR 614B may send a PIM join request identifying (*, G) or (S, G) to FHR/RP 608 to request to join the multicast distribution tree for (S, G) to begin receiving multicast content sourced by multicast server 621. At this point, LHR 614B is an interested receiver 618B for (S, G). LHR 614B may execute a dedicated routine or application to receive and handle the multicast content. The routers of network 660 extend the multicast distribution tree to reach LHR 614B, and the routers of network 660 also extend the parallel connection-oriented distribution tree to LHR 614B. That is, the routers of network 660 create TCP connections 622H, 622E, and 622D to reach LHR 614B from FHR/RP 608. FHR/RP 608 begins replicating multicast flow 606A on the parallel connection-oriented distribution tree to LHR 614B, according to techniques described elsewhere in this disclosure, e.g., with respect to multicast flow 606A toward LHR 614A.

LHR 614B as an interested receiver 618B for (S, G) for the application session for content request 630 receives multicast flow 606A and operates similarly to LHR 614A as an interested receiver 618A. That is, LHR 614B extracts multicast flow 606A from the TCP connection 622D, extracts unicast traffic 605 from multicast flow 606A, and sends the unicast traffic 605 to client 615B-A that sent content request 630. LHR 614B earlier created or otherwise obtained a mapping that maps the (S, G) information from the UDP header for the multicast flow 606A to identify any clients 615 to which unicast packets of unicast traffic 605 should be forwarded. In this case, for LHR 614B, only client 615B-A is mapped to the (S, G) multicast group and is a client of server 602. LHR 614B therefore sends the unicast packets for unicast traffic 605 to client 615B-A. LHR 614B may rewrite the headers of these unicast packets to be destined to client 615B-A. Since the original application session was started by client 615A-A, the headers of the unicast packets may be destined to 615A-A. Consequently, using the reliable and connection-oriented multicast framework that supports reliability for the multicast distribution tree for (S, G), network 660 may in this way reliably deliver, using multicast distribution, unicast packets for multiple application sessions by (1) intercepting unicast traffic, (2) reliably multicast the traffic, and (3) impersonate server 602 with LHRs 614 to perform transport session protocol functions to deliver the replicated unicast traffic to clients 615 of server 602.

The above techniques may provide the following technical advantages. Network load may be reduced as there is only single data-streaming happening for multiple content requests generated from a network segment (e.g., a set of clients attached to a single LHR 614). Internet as well as intranet network load are reduced, thereby giving space to other activities. Load on the server 602 may be reduced because only single data-streaming for a single application session is done by the server for, potentially, many thousands of content requests generated from a single network segment. Not only the server 602 and network loads on network 660 may be reduced, but the overall cost associated to get the services may be reduced. Further, one or more of the above advantages can be achieved, at least in some cases, without changing the server 602 and client 614 applications and without additional hardware infrastructure.

Figure 10:
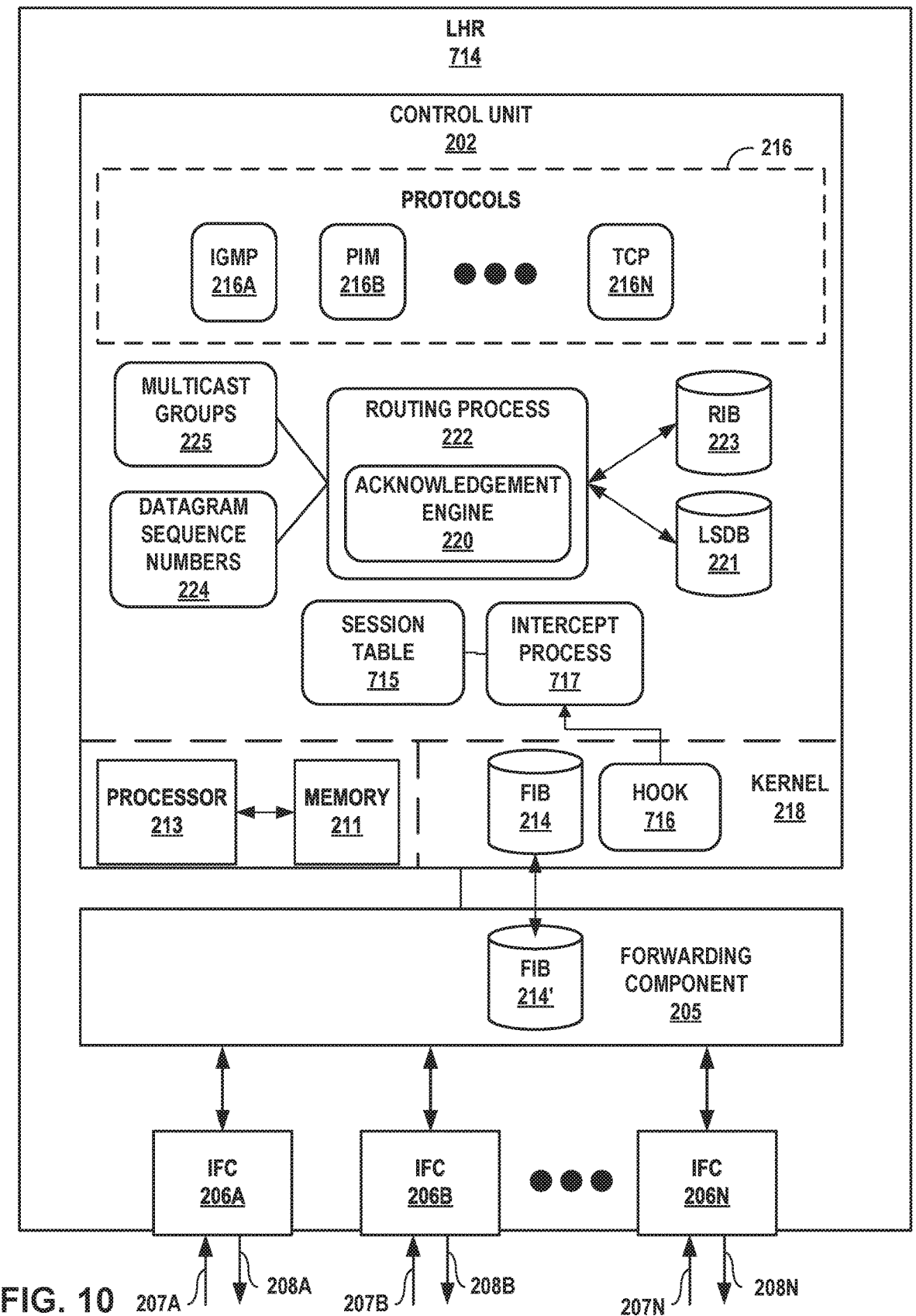
FIG. 10 is a block diagram illustrating an example last hop router, according to techniques described in this disclosure.

FIG. 10 is a block diagram illustrating a last hop router, according to techniques of this disclosure. LHR 714 is similar to LHR 114 of FIG. 2 and performs many of the same operations for reliable multicasting described herein. LHR 714 includes a hook 716, intercept process 717, and session table 715. Session table 715 stores mappings of session identifiers for applications sessions to multicast groups for the session identifiers. Session table 715 may also store a mapping of the multicast groups to clients 615 that are to receive unicast traffic received by LHR 714 as multicast traffic for the one of the multicast groups in session table 715.

Hook 716 represents a filter or other rule, code, or construct in kernel 218, and more specifically the networking stack, to cause kernel 218 direct some traffic received by LHR 714 to intercept process 717. In some cases, hook 716 is installed at the PREROUTE or POSTROUTE stage of the network layer for the networking stack.

Intercept process 717 identifies sessions at the application level by processing content requests or content replies. Intercept process 717 determines the session identifiers from, e.g., the application layer headers. If session table 715 already stores a mapping of a multicast group to a session, intercept process 717 may for a TCP session send a FIN to server 602 and impersonate the server 602 for clients 615 to which LHR 714 is sending unicast traffic (received via reliable multicasting) for the session. The clients 615 may be unaware of this arrangement. For a UDP session, intercept process 717 may simply block the content request from the client to server 602.

FHR/RP 608 may have similar components in the form of an intercept process that intercepts the unicast traffic from the server 602 and pushes the unicast traffic onto the multicast distribution tree and/or the parallel connection-oriented distribution tree based on a session to multicast group mapping in the session table of FHR/RP 608.

LHR 714 receives multicast flows, which intercept process 717 intercepts. Intercept process 717 queries the session table 715 to see if there is a session for this multicast flow (e.g., based on the (S, G) mapping). If so, intercept process 717 modifies and/or generates unicast traffic from the multicast flows to be forwarded to clients mapped in session table 715 to that multicast flow.

Figure 11:
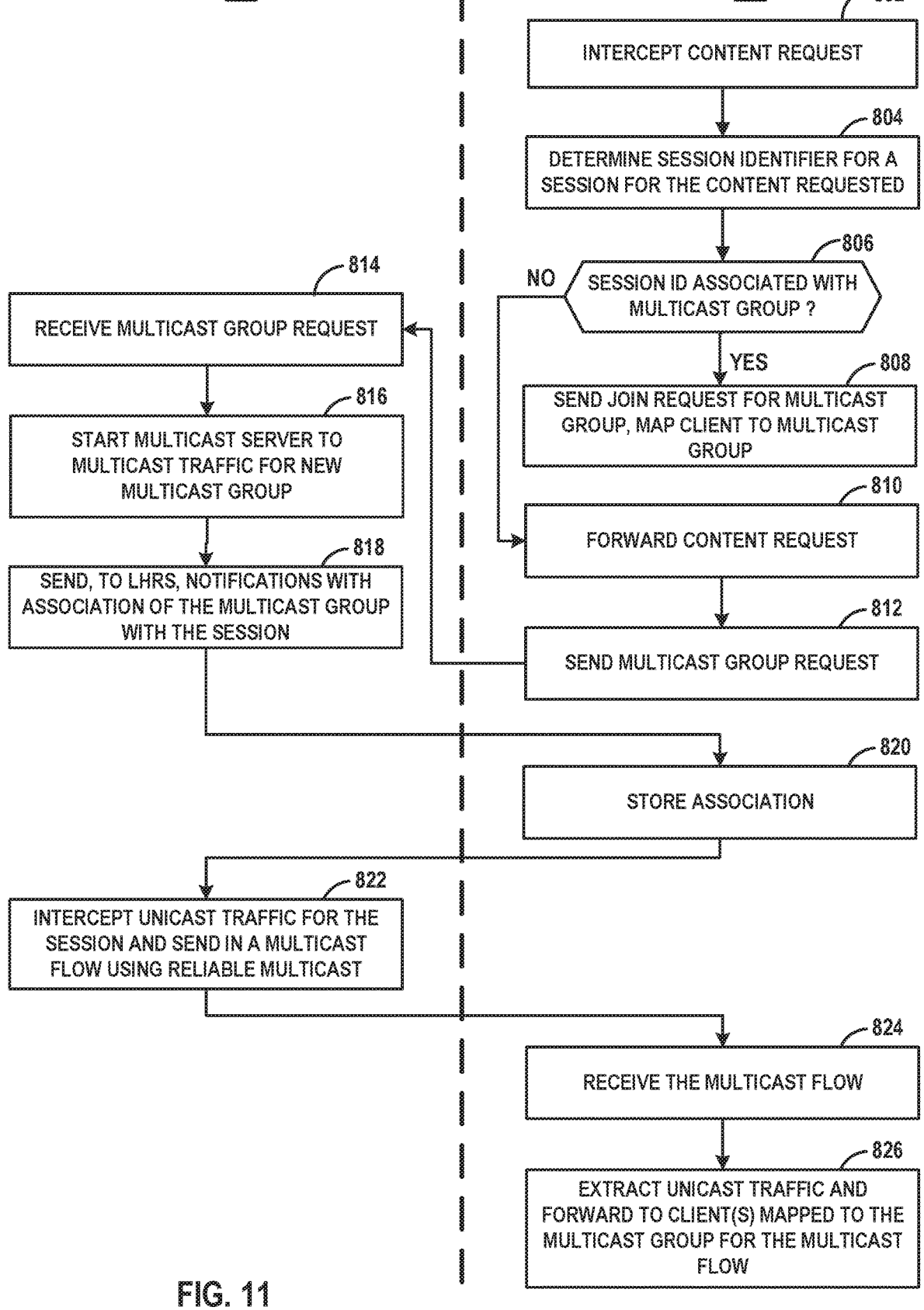
FIG. 11 is a flowchart illustrating an example of content delivery by a network, according to techniques described in this disclosure.

FIG. 11 is a flowchart illustrating content delivery by a network, according to techniques described in this disclosure. Operations 800 are described with respect to FHR/RP 608 and LHRs 614 but may be performed by any first hop routers and last hop routers described in this disclosure. Last hop router 614A intercepts a content request 620 from a client 615A-A on a network segment served by LHR 614A (802). LHR 614A determines a session identifier for an application session for the content request 620 (804). If LHR 614A stores data associating the session identifier with a multicast group (YES branch of 806), LHR 614A outputs a join request for the multicast group and maps the client 615A-A to the multicast group (808). If not (NO branch of 806), LHR 614A forwards the content request 620 to the server 602 (810) and sends a multicast group request 623 to FHR/RP 608 for traffic received from the server 602 (812).

FHR/RP 608 receives the multicast group request 623 (814). In response, FHR/RP 608 executes a multicast server 621 to reliably multicast received unicast traffic using a new multicast group for the application session for the content request 620 (816). FHR/RP 608 sends multicast group notification 627 to each of the LHRs 614 known to it to notify the LHRs of an association of the multicast group and the session identifier (818). FHR/RP 608 may be configured with a list of known edge routers in network 660, or routers 608, 614, and/or 662 may exchange capability advertisements to notify other routers of their capability to serve as an interested multicast receiver 618. Each of LHRs 614 that receives multicast group notification 627 stores the association of the multicast group and the session identifier to a data structure for subsequent mapping of content requests to existing multicast groups (820). In this way, subsequent content requests corresponding to the same application session can be immediately attached to the multicast distribution tree by the LHR 614, which receives the subsequent content request, by sending a multicast join request to FHR/RP 608 as the multicast source, if the LHR has not already joined, and creating a mapping for forwarding the multicast traffic received on the multicast distribution tree to the requesting client.

FHR/RP 608 intercepts unicast traffic 605 from source server 602 and distributes that traffic using reliable multicast techniques described herein as multicast flow 606A (822), including to LHR 614A that has joined the multicast group. LHR 614A, as an interested receiver 618A, receives the multicast flow 606A, whether sent on the multicast distribution tree for the multicast group or on the parallel connection-oriented tree (824), extracts the unicast traffic 605 encapsulated therein and sends the unicast traffic 605 to clients mapped 615 to the multicast group (826).

In some cases, LHR 614A modifies the application session header for the application session in one or more packets of the unicast traffic 605. In general, streaming content will have or at least begin with an application session identifier in an application session header to identify which session this data belongs to when multiple sessions of the same application are running. Once a client and server have exchanged a content identifier, the session is executed by the LHR 614A. This can occur after a three-way handshake with the server in which client requests the content from the server and before splicing TCP end points. LHRs 614 create an end point for the TCP connection and will map the TCP session with the specific (S, G) to the client. At this point, an LHR 614 also stores the session information for the application. Since the packet from the server will have session information for a given session that initiated the request, LHR 614 may need to modify this session information at when it identifies (S, G) with all TCP sessions for which the data packet belongs, prior to putting the packet on the individual TCP/UDP sockets to the clients.

The techniques described in this disclosure may be implemented, at least in part, in hardware, or combinations of hardware with software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A system comprising:
a plurality of non-last-hop routers (non-LHRs) of a network, the non-LHRs configured with a multicast distribution tree for a multicast group to transport first multicast packets of a multicast flow toward one or more last-hop routers (LHRs),
wherein a router of the non-LHRs is configured to send, to each of the one or more LHRs, a multicast group notification message including an association of the multicast group and a session identifier for an application session,
wherein each of the one or more LHRs is configured to store the association of the multicast group and the session identifier for the application session, and
wherein the router of the non-LHRs is configured to receive unicast packets for the application session associated with the multicast group, encapsulate the unicast packets in a multicast header to generate the first multicast packets for distribution using the multicast distribution tree, and output the first multicast packets; and
the one or more LHRs, wherein the one or more LHRs are interested receivers of the multicast group,
wherein an LHR of the one or more LHRs is configured to receive a content request from a client of one or more clients of the application session, and
wherein the LHR is configured to, in response to determining a session identifier for the content request matches the session identifier for the application session, based on the association of the multicast group and the session identifier for the application session, request to join the multicast group, and
wherein the one or more LHRs are configured to receive the first multicast packets of the multicast flow, extract the unicast packets for the application session, and send the unicast packets to the one or more clients of the application session.

2. The system of claim 1,
wherein a first LHR of the one or more LHRs is configured to, in response to receiving a different content request from a requester client of the one or more clients of the application session, send a multicast group request to the router of the non-LHRs, and
wherein the router of the non-LHRs is configured to, in response to receiving the multicast group request, create the multicast group.

3. The system of claim 2,
wherein the multicast group request includes the session identifier for the application session, and
wherein the router of the non-LHRs is configured to store the association of the session identifier and the multicast group.

4. The system of claim 3, wherein the session identifier is based at least on a content identifier and a server identifier for a server that serves, by outputting the unicast packets, content associated with the content identifier.

5. The system of claim 2,
wherein to send the unicast packets to the requester client, the first LHR is configured to map, based at least on the association of the multicast group and the requester client, a destination group address of the first multicast packets to the requester client.

6. The system of claim 1,
wherein the router of the non-LHRs is configured to execute a multicast server to source the first multicast packets, and
wherein the multicast distribution tree is identified by a source address for the multicast server and a group address for the multicast group.

7. The system of claim 1,
where a first LHR of the LHRs is configured to terminate a transmission control protocol (TCP) session with a client of the one or more clients of the application session and send the unicast packets to the client using the TCP session.

8. The system of claim 1,
wherein the non-LHRs and the LHRs are configured with a parallel, connection-oriented distribution tree for the multicast distribution tree, the connection-oriented distribution tree for replicating second multicast packets of the multicast flow reliably and in order to the LHRs, wherein the connection-oriented distribution tree comprises one or more transmission control protocol (TCP) connections, and wherein each packet of the second multicast packets is a copy of a corresponding packet of the first multicast packets, and
wherein the LHR of the LHRs, in response to determining that the LHR has received a multicast packet of the first multicast packets via the multicast distribution tree out of order to create a gap of one or more packets of the first multicast packets for the multicast flow, forwards, to at least one of the interested receivers, the packets of the second multicast packets that are copies of the gap of one of more packets of the first multicast packets and that are received by the LHR via the connection-oriented distribution tree.

9. The system of claim 8, wherein the router of the non-LHRs is configured to add a respective sequence number to each packet of the first and second multicast packets.

10. The system of claim 9, wherein to add the respective sequence number to each packet of the first and second multicast packets, the router of the non-LHRs is configured to insert the respective sequence number between a respective header and a respective payload of each packet of the first and second multicast packets.

11. The system of claim 9, wherein to determine that the LHR has received the multicast packet of the first multicast packets out of order to create the gap, the LHR is configured to determine that the respective sequence number of a last-received packet of the first multicast packets is greater than the respective sequence number of one or more unreceived packets of the first multicast packets.

12. The system of claim 8,
wherein a non-LHR of the non-LHRs is configured to buffer the second multicast packets in one or more local buffers, wherein the LHR is configured to transmit, in response to determining that the LHR has received the multicast packet of the first multicast packets out of order to create the gap, a selective acknowledgement (SACK) message to the non-LHR, and wherein the non-LHR is configured to retransmit packets of the second multicast packets that are copies of the gap to the LHR over a TCP connection of the connection-oriented distribution tree.

13. The system of claim 12, wherein the LHR is configured to transmit, in response to determining that the LHR has received the retransmitted packets close the gap, an acknowledgment (ACK) message to the non-LHR, and wherein the non-LHR is configured to purge the one or more local buffers of the second multicast packets in response to receiving the ACK message from the LHR.

14. The system of claim 1, wherein each of the first multicast packets includes an Internet protocol (IP) header of the corresponding encapsulated unicast packet.

15. A system comprising:

a plurality of non-last-hop routers (non-LHRs) of a network, the non-LHRs configured with a multicast distribution tree for a multicast group to transport first multicast packets of a multicast flow toward one or more last-hop routers (LHRs), wherein a router of the non-LHRs is configured to receive unicast packets for an application session associated with the multicast group, encapsulate the unicast packets in a multicast header to generate the first multicast packets for distribution using the multicast distribution tree, and output the first multicast packets; and the one or more LHRs, wherein the one or more LHRs are interested receivers of the multicast group, wherein the router of the non-LHRs is configured to store an association of the multicast group with a source address and a destination address for the application session, wherein, to receive the unicast packets, the router of the non-LHRs is configured to intercept the unicast packets and identify, based at least on matching a source address and destination address of the unicast packets to the source address and the destination address for the application session, the multicast group, wherein the router of the non-LHRs is configured to encapsulate the unicast packets in the multicast header based on the multicast group, and wherein the one or more LHRs are configured to receive the first multicast packets of the multicast flow, extract the unicast packets for the application session, and send the unicast packets to one or more clients of the application session.

16. The system of claim 15, wherein the destination address of the unicast packets is an address of one of the clients of the application session.

17. (Proposed - Amended): A router comprising: processing circuitry in communication with a memory, the processing circuitry being configured to:

implement a multicast distribution tree for a multicast group to transport first multicast packets of a multicast flow toward one or more last-hop routers (LHRs) of a network that includes the router operating as a non-LHR;

receive a multicast group request including a session identifier for an application session;

create, in response to receiving the multicast group request, a multicast group for the application session;

send, to each of the one or more LHRs, a multicast group notification message including an association of the multicast group and the session identifier for the application session;

receive a request to join the multicast group sent by an LHR of the one or more LHRs:

receive unicast packets for the application session associated with the multicast group;

encapsulate the unicast packets in a multicast header to generate first multicast packets for distribution using a multicast distribution tree; and output the first multicast packets.

18. A router comprising:

processing circuitry in communication with a memory, the processing circuitry being configured to:

receive, from a non-last-hop router of a network that includes the router, a multicast group notification message that includes an association of a multicast group and a session identifier for an application session;

store, in response to receiving the multicast group notification message, the association of the multicast group and the session identifier for the application session;

receive a content request from a client of one or more clients of the application session;

in response to determining a session identifier for the content request matches the session identifier for the application session, based on the association of the multicast group and the session identifier for the application session, request to join the multicast group;

receive first multicast traffic for the multicast group;

extract unicast packets for the application session from the first multicast traffic; and send the unicast packets to the client.

* * * * *